United States Patent [19]

Funahashi et al.

[11] Patent Number: 5,528,571
[45] Date of Patent: Jun. 18, 1996

[54] OPTICAL DISC APPARATUS

[75] Inventors: Takeshi Funahashi, Saitama; Yoshikatsu Niwa, Kanagawa, both of Japan

[73] Assignee: Sony Corporation, Tokyo, Japan

[21] Appl. No.: 254,971

[22] Filed: Jun. 7, 1994

[30] Foreign Application Priority Data

Jun. 8, 1993 [JP] Japan ................................ 5-137922
May 13, 1994 [JP] Japan ................................ 6-099942

[51] Int. Cl.⁶ .................................................. G11B 7/00
[52] U.S. Cl. ........................ 369/58; 369/54; 369/47; 369/59; 369/60
[58] Field of Search ........................ 369/54, 58, 53, 369/59, 60, 47, 48, 49, 32, 124; 360/55, 48, 53, 54

[56] References Cited

U.S. PATENT DOCUMENTS

| | | | |
|---|---|---|---|
| 4,845,696 | 7/1989 | Ohtsuki et al. ........................ | 369/13 |
| 4,949,326 | 8/1990 | Takagi et al. ........................ | 369/54 |
| 4,984,230 | 1/1991 | Satoh et al. ........................ | 369/54 |
| 5,130,969 | 7/1992 | Sako ........................ | 369/58 |
| 5,132,956 | 7/1992 | Ichikawa ........................ | 369/54 |
| 5,202,876 | 4/1993 | Takagi et al. ........................ | 369/58 |
| 5,270,877 | 12/1993 | Fukushima et al. ........................ | 360/48 |
| 5,442,614 | 8/1995 | Tamegai ........................ | 369/58 |

*Primary Examiner*—Georgia Y. Epps
*Assistant Examiner*—Muhammad N. Edun
*Attorney, Agent, or Firm*—Limbach & Limbach; Philip M. Shaw, Jr.

[57] ABSTRACT

A disc driving apparatus using SSA (sector slipping algorithm) for defective sectors and LRA (linear replacement algorithm). This disc driving apparatus is simple in arrangement and can reproduce data at high speed in a simple processing on the basis of attribute data representing whether a defective sector is processed by the SSA or the LRA. This disc driving apparatus includes an optical head for reproducing data recorded in an optical disc, a drive controller for controlling operation of the optical head, a memory for temporarily storing reproduced data, a DMA (dynamic memory access) controller for controlling an access to the memory, and a system controller for controlling the drive controller and the DMA controller by supplying first and second command signals thereto in response to a main command signal requesting a write or read operation on a series of sectors.

12 Claims, 7 Drawing Sheets

| 104 BYTES | 16 BYTES |
|---|---|
| DATA | E C C |
| Da0, Da1, Da2, Da3, ····Dan | ECC0 |
| Db0, Db1, Db2, Db3, ····Dbn | ECC1 |
| Dc0, Dc1, Dc2, Dc3, ····Dcn | ECC2 |
| Dd0, Dd1, Dd2, Dd3, ····Ddn | ECC3 |
| De0, De1, De2, De3, ····Den | ECC4 |

OPTICAL DISC APPARATUS

BACKGROUND OF THE INVENTION

1. Field of the Invention

The present invention relates to a disc apparatus for use in an optical disc drive using an optical disc in which data can be recorded once or a plurality of times, for example.

2. Description of the Prior Art

In the prior art, optical discs (magneto-optical disc) have been used to store mass data, such as image data or the like.

FIG. 1 of the accompanying drawings shows an example of a track pattern of such conventional optical disc. As shown in FIG. 1, in the optical disc, the track begins with 0 from the outside and ends with alternate tracks AT0, AT1, AT2 which will be described later on. One track is comprised of a plurality of sectors (for areas), and one sector is comprised of 512 bytes. While the track pattern is concentric in shape as shown in FIG. 1 for simplicity, the track pattern is not limited thereto and may be spiral in shape. In this case, the arrangement of one track and the arrangement of one sector are similar as described above.

In FIG. 1, sectors Tn-2s0, Tn-2s1, Tn-2s2 of n-2th track, a sector Tn-1s0 of n-1th track and a sector Tns0 of nth track constitute a part of the whole optical disc.

An optical disc drive is used to write data on the optical disc and to read out the data stored on the optical disc. The optical disc drive comprises a drive controller for writing data on the optical disc and reading out the data stored on the optical disc by driving an optical head, an optical data controller (ODC) for supplying data to the drive controller and receiving data from the drive controller and a system controller for controlling the drive controller and the optical data controller on the basis of a command signal from a host equipment (e.g., computer).

The drive controller includes a DSP (digital signal processor) which becomes the center of control and the system controller includes a CPU (central processing unit) which becomes the center of control.

When data is written on the optical disc, data supplied from the host equipment is temporarily stored in an internal memory by the optical data controller in response to a command signal from the system controller, and then read out from the memory. The data thus read out is processed in some suitable data processing fashion, such as addition of error correction code (ECC) or the like and then supplied to the drive controller so that the data is written in the optical disc by the optical head of the drive controller.

When data is read out from the optical disc, data stored on the optical disc is read out by the optical head of the drive controller in response to a command signal from the system controller. The data thus read out is supplied from the drive controller to the optical data controller, in which it is processed in some suitable data processing fashion, such as error detection and error correction and then temporarily stored in the memory. Then, the data is read out from the memory and fed to the host equipment.

FIG. 2 is a diagram showing an example of a format of the optical disc. As shown in FIG. 2, one sector is comprised of 1 byte data Da0, Da1, Da2, Da3, . . . , Dan, data Db0, Db1, Db2, Db3, . . . , Dbn, data Dc0, Dc1, Dc2, Dc3, . . . , Dcn, data Dd0, Dd1, Dd2, Dd3, . . . , Ddn, data De0, De1, De2, De3, . . . , Den and error correction codes ECC0, ECC1, ECC2, ECC3 and ECC4 added to the above-mentioned data rows.

One data row is formed of 104 bytes and each of the error correction codes ECC0 through ECC4 is formed of 16 bytes added to one data row.

It is customary that these data are sequentially written on the optical disc in the sector unit. As shown in FIG. 3, when data shown in FIG. 2 are written on the optical disc, these data are interleaved at every five data in such a way as Da0, Db0, Dc0, Dd0, De0, Da1, Db1, Dc1, Dd1, De1, . . . , Dan, Dbn, Dcn, Ddn, Den, which is generally referred to as "five interleaving".

When data is read out from the optical disc, the above-mentioned interleaved data rows are de-interleaved to the original data rows of every line shown in FIG. 2 and error-detected at every sector by using the error correction code (ECC) shown in FIG. 2. If it is determined by the error detection that a line has four errors or less and a sector has 20 errors or less, then such sector is not regarded as a defective sector. If however it is determined that a line has four errors or greater and one sector has 20 errors or greater, then such sector is regarded as a defective sector. The ECC has an error correction capability such that 8 errors per line can be error-corrected at maximum.

Since there is the possibility that a defective sector will be produced in the manufacturing process of the optical disc, prior to the delivery of the optical disc products, the optical disc manufacturer writes inspection data in the whole surface of the optical disc and reads out the inspection data thus written on the optical disc. When the written data is read out, it is determined whether or not there is any sector which exceeds the above-mentioned error tolerance range. This inspection is referred to as a "disc certify". After this inspection is performed, data is written in a table on the optical disk such that the defective sectors can be recognized as inaccessible.

FIG. 4 shows an example of such a table. In FIG. 4, reference symbol T0 depicts the track 0 of the optical disc, and reference symbol Tn depicts a track n of the optical disc. As shown in FIG. 4, the data of tables Tab1 and Tab2 representing the defective sector are formed at the leading track and tables Tab3 and Tab4 representing the defective sector are formed at the last track. When the optical disc apparatus is powered on, any data in tables Tab1 to Tab4 is read out and stored in memory. Thereafter, when data is written or read out, the defective sector can be prevented from being used by checking for the data of tables Tab1 to Tab4 stored in memory.

The reason that four tables Tab1 to Tab4 are provided is to improve reliability by using the data of the table Tab2 when the data of the table Tab1 is defective, to use the data of the table Tab3 when the data of the table Tab2 is defective and to use the data of the table Tab4 when the data of the table Tab3 is defective.

The use of the table data will be described in more detail with reference to FIG. 1. When the sector Tn-2s1 of the n-2th track shown in FIG. 1 is a defective sector, information indicating that the sector Tn-2s1 is a defective sector is stored in the above-mentioned tables. Specifically, although the sector Tn-2s1 shown in FIG. 1 should be used as the sector 1 from a physical position standpoint, the sector Tn-2s2 is stored as the sector 1 because sector Tn-2s1 is defective. Therefore, the optical disc apparatus uses the sector Tn-2s2 as the sector 1.

The method for preventing the defective sector from being used by assigning the sector No. to the next sector after a defective sector when a defective sector is detected by the disc certify is generally referred to as "SSA" (sector slipping algorithm).

It is frequently observed that a defective sector can occur after the defective sectors have been identified by the disc certify and tables constructed than. In that case, the new defective sector is excluded by performing additional sector slipping, and all sector Nos. of sectors following the new defective sector are shifted.

In the present invention, a LRA (linear replacement algorithm) is proposed as a method in which a defective sector occurring after the disc certify is not used and the sector numbers assigned in the disc certify need not be shifted.

It is customary that, when data is written on an optical disc, a "disc verify" step is performed to verify that the data is written accurately. The "disc verify" is performed by reading out stored data after the data was written to verify whether or not the data is written correctly. According to the linear replacement algorithm (LRA), if it is determined by the disc verify that data is not correctly written in a sector, then such sector is defective and replacement sectors are formed in the alternate tracks AT0 and AT1 shown in FIG. 1, for example. Then, the sector No. of the sector that was determined to be defective is assigned to the newly formed replacement sector.

If it is determined by the disc verify that the sector Tn-2s1 of the n-2th track is a defective sector, then a new replacement sector is formed in alternate track AT0, for example, and data that should be written in the defective sector is written in the replacement sector.

Upon reading, after data of the sector Tn-2s0 of the n-2th track is read out, data of the next sector Tn-2s1 is not read out. The optical pickup (not shown) instead seeks the alternate track AT0 to read out the data of the replacement sector of the alternate track AT0. Subsequently, the optical pickup seeks the n-2th track to read out data of the sector Tn-2s2 of the n-2th track.

FIG. 5 is a diagram showing the processing flow used when data is read out from an optical disc. In FIG. 5, reference symbols n−1 to n+6 depict physical sector Nos., respectively. Reference symbol n+5' depicts a sector No. of the sector formed on the above alternate track. Solid arrows with reference symbols Ca depict command signals supplied from the CPU of the system controller to the DSP of the drive controller. Also, solid arrows with reference symbols Cb depict command signals supplied from the CPU of the system controller to the optical data controller. Solid arrows with reference symbols Aa depict answer signals, representing that the processing is normally completed, that are supplied from the DSP of the drive controller to the CPU of the system controller. Solid arrows with reference symbols Ab depict answer signals supplied from the optical data controller to the CPU of the system controller.

Reference symbol Def1 which corresponds to the position of the physical sector No. n+2 depicts a sector which is detected as a defective sector upon disc certify. Reference symbol Def2, which corresponds to the physical sector No. n+5, depicts a sector which is detected as a defective sector by a "disc verify" executed when data is written after the disc certify. A replacement sector of the defective sector becomes the sector whose physical sector No. is n+5'.

Assuming now that the physical sector begins with n−1 shown in FIG. 5, then when it is determined by the disc certify that the sector of the physical sector No. n+2 is the defective sector, the sector Nos. of the physical sector Nos. n−1, n+0, n+1, n+3. n+4, n+5, n+6 sequentially become 0, 1, 2, 3, 4, 5, 6, for example. That is, the tables Tab1 to Tab4 reveal that the physical sector No. n+2 is the defective sector.

The sector of the physical sector No. n+5 that was detected as the defective sector when the disc is verified is not accessed but, instead, the sector of the physical sector No. n+5', which is the replacement sector, is accessed.

The data read-out operation executed by the CPU of the system controller, the DSP of the drive controller and the optical data controller will be described below.

When a read-out request signal representing the read of the data of the sectors ranging from the physical sector Nos. n+0 to n+6 is transmitted from the host equipment to the CPU of the system controller, the CPU of the system controller supplies the optical data controller with a command signal Cb1 representing that the data of 2 sectors should be stored in the memory. The reason that the command signal represents that the data of 2 sectors should be stored in the memory to the optical data controller is to read out the data of before the sector of sector No. n+1 because sector No. n+2 is the defective sector Def1.

Subsequently, the CPU of the system controller supplies the DSP of the drive controller with the command signal Ca1 representing that data of 2 sectors should be read out from sector No. n+0.

When the command signal Ca1 from the CPU of the system controller is transmitted to the DSP of the drive controller, data of 2 sectors from the sector of the physical sector No. n+0 (i.e., data of the sectors of the physical sector Nos. n+0 and n+1) of the optical disc is read out by the optical head and the data thus read out is supplied to the optical data controller. The data of 2 sectors supplied to the optical data controller is stored in the memory.

Then, the answer signal Aa1 for the command signal Ca1 is supplied from the DSP of the drive controller to the CPU of the system controller and the answer signal Ab1 for the command signal Cb1 is supplied from the optical data controller to the CPU of the system controller.

Thereafter, the CPU of the system controller supplies the optical data controller with the command signal Cb2 representing that data of 2 sectors ranging from the sector Nos. n+3 and n+4 should be stored in the memory. Then, the CPU of the system controller supplies the DSP of the drive controller with the command signal Ca2 representing that data of 2 sectors from the sector of the physical sector No. n+3 should be read out.

When the command signal Ca2 from the CPU of the system controller is transmitted to the DSP of the drive controller, data of 2 sectors from the sector of the physical sector No. n+3 (i.e., data of the sectors of the physical sector Nos. n+3 and n+4) of the optical disc is read out by the optical head of the drive controller, and the data thus read out is supplied to the optical data controller. The data of 2 sectors supplied to the optical data controller is stored in the memory.

Subsequently, the answer signal Aa2 for the command signal Ca2 is supplied from the DSP of the drive controller to the CPU of the system controller, and the answer signal Ab2 for the command signal Cb2 is supplied from the optical data controller to the CPU of the system controller.

When the answer signals Aa2 and Ab2 are supplied, the CPU of the system controller carries out a seek operation in order to read out data of the sector of the physical sector No. n+5' which is the replacement sector of the defective sector Def2 because the sector of the physical sector No. n+5 is the defective sector Def2.

Before the data of the sector of the physical sector No. n+5' the readout after the CPU of the system controller has carried out the seek operation, the CPU of the system controller supplies the optical data controller with the command signal Cb3 representing that data of 1 sector should be stored in the memory. Thereafter, the CPU of the system controller supplies the DSP of the drive controller with the command signal Ca3 representing that data of 1 sector should be read out from the sector of the physical sector No. n+5'. As described above, since the sector of the physical sector No. n+5 is the sector which was detected as the defective sector when the disc was verified, the CPU of the system controller instructs the DSP of the drive controller to read out data from the replacement sector of the defective sector, i.e., the sector of the physical sector No. n+5 of the alternate track.

When the command signal Ca3 from the CPU of the system controller is transmitted to the DSP of the drive controller, data of 1 sector from the physical sector No. n+5' (i.e., data of the sector of the physical sector No. n+5') of the optical disc is read out by the optical head of the drive controller, and the data thus read out is supplied to the optical data controller. The data of 1 sector supplied to the optical data controller is stored in the memory.

Then, the answer signal Aa3 for the command signal Ca3 is supplied from the DSP of the drive controller to the CPU of the system controller, and the answer signal Abs for the command signal Cb3 is supplied from the optical data controller to the CPU of the system controller.

When the answer signals Aa3 and Ab3 are supplied, the CPU of the system controller effects the seek operation on the track of the sector n+6 in order to read out data of the sector of the physical sector No. n+6.

The CPU of the system controller supplies the optical data controller with the command signal Cb4 representing that data of one sector should be stored in the memory.

Subsequently, the CPU of the system controller supplies the DSP of the drive controller with the command signal Ca4 representing that data of 1 sector should be read out from the sector of the physical sector No. n+6.

When the command signal Ca4 from the CPU of the system controller is supplied to the DSP of the drive controller, data of 1 sector from the sector of the physical sector No. n+6 (i.e., data of the physical sector No. n+6) of the optical disc is read out by the optical head of the drive controller, and the data thus read out is supplied to the optical data controller. The data of 1 sector supplied to the optical data controller is stored in the memory.

Thereafter, in this example, at the succeeding position of the position of a physical sector No. n+7 (not shown), the answer signal Aa4 for the command signal Ca4 is supplied from the DSP of the drive controller to the CPU of the system controller, and the answer signal Ab4 for the command signal Cb4 is supplied from the optical data controller to the CPU of the system controller.

In the above-mentioned example, however, since the defective sector detected by the disc certify exists, command signals are issued twice in order to access the sectors of the physical sector Nos. n+0 and n+1. Further, command signals are issued twice in order to access the sector of the physical sector No. n+2, i.e., the sectors of the physical sector Nos. n+3 and n+4 following the defective sector. In the above-mentioned example, although the command signal supplied from the host equipment side represents that the sectors of the physical sector Nos. n+0 to n+6 should be accessed, because of the defective sector detected by the disc certify, the command signals must be issued four times in sum total in order to access the sectors of the physical sector Nos. n+0 to n+4.

If the answer signals Aa1 and Ab1 and the command signals Ca2 and Cb2 were not issued within a time of one sector of the physical sector No. n+2, the sectors would not be accessed until the optical disc is rotated once. In the example shown in FIG. 5, since the command signal Ca2 is issued within a time of the sector of the sector No. n+2 and the command signal Ca4 is issued within a time of the sector of the sector No. n+4, the sectors can be accessed regardless of the revolution of the optical disc. Since, however, a time of one sector is 400 μsec, there is then the large possibility that the sector will not be accessed until the optical disc is rotated once (referred to hereinafter as "one rotation waiting" for simplicity). When the optical disc is rotated at the rotational speed of 2400 r.p.m., for example, if the sector is not accessed until the optical disc is rotated once, then there occurs a delay time of 25 msec. Therefore, if the sector is not accessed until the optical disc is rotated once, there is then the disadvantage that the data transfer rate is lowered.

Further, if the defective sector that was detected as the defective sector by the disc verify falls within an access range, the seek operation must be effected on the track ranging from the defective sector Def2 to the position at which the replacement sector of the physical sector No. n+5' of the alternate track is accessed, and the replacement sector must be accessed, whereafter the seek operation must be carried out again in order to access the next sector (physical sector No. n+6) of the defective sector Def2. Specifically, if the seek operation is carried out in order to access the sector of the alternate track each time the defective sector is accessed and the seek operation is again carried out in order to access the next sector of the defective sector as described above, then it is natural that the data transfer rate is lowered.

Furthermore, as is clear from the above description, the similar disadvantage occurs also when data is written on the optical disc.

SUMMARY OF THE INVENTION

In view of the discussion above, it is an object of the present invention to provide a disc driving apparatus which can write and read data at high speed with a simple arrangement and simple processing.

According to a first aspect of the present invention, there is provided a disc driving apparatus for reproducing information signals recorded in a series of unit recording areas of a disc type recording medium, a defective area of the unit recording area being substituted by a following unit recording area. This disc driving apparatus is comprised of a reproducing device for reproducing the information signals recorded in the disc type recording medium, a first control circuit for controlling an operation of the reproducing device, a memory for temporarily storing the information signals reproduced by the reproducing device, a second control circuit for controlling an operation of the memory, and a system control circuit responsive to a main command signal for supplying a first command signal and a second command signal to the first control circuit and the second control circuit, respectively, the first command signal indicating to reproduce all unit areas indicated in the main command signal and all defective areas existing among the unit areas indicated in the main command signal, and the second command signal indicating not to write the information signal reproduced from the defective area into the memory.

According to a second aspect of the present invention, there is provided a disc driving apparatus for reproducing information signals in a series of unit recording areas of a disc type recording medium, a defective area of the unit recording area being substituted by a following unit recording area. This disc driving apparatus is comprised of a reproducing device for reproducing the information signals recorded in the disc type recording medium, a first control circuit for controlling an operation of the reproducing device, an error correction circuit for error-correcting the information signals reproduced by the reproducing device, a second control circuit for controlling an operation of the error correction circuit, and a system control circuit responsive to a main command signal for supplying a first command signal and a second command signal to the first control circuit and the second control circuit, respectively, the first command signal indicating to reproduce all unit areas indicated in the main command signal and all defective areas existing among the unit areas indicated in the main command signal, and the second command signal indicating not to error-correct the information signal reproduced from the defective area.

According to a third aspect of the present invention, there is provided a disc driving apparatus for recording information signals in a series of unit recording areas of a disc type recording medium, a defective area of the unit recording area being substituted by a following unit recording area. This disc driving apparatus is comprised of a recording device for recording the information signals to the disc type recording medium, a first control circuit for controlling an operation of the recording device, a memory for temporarily storing the information signals which are to be recorded in the disc type recording medium, a second control circuit for controlling an operation of the memory means, and a system control circuit responsive to a main command signal for supplying a first command signal and a second command signal to the first control circuit and the second control circuit, respectively, the first command signal indicating to record all unit areas indicated in the main command signal and all defective areas existing among the unit areas indicated in the main command signal, and the second command signal indicating not to read the information signal corresponding to the position of the defective area.

According to a fourth aspect of the present invention, there is provided a disc driving apparatus for reproducing information signals recorded in a series of unit recording areas of a disc type recording medium, a defective area of the unit recording area being substituted by an alternate recording area which is located apart from the series of unit recording areas. This disc driving apparatus is comprised of a reproducing device for reproducing the information signals recorded in the disc type recording medium, a first control circuit for controlling an operation of the reproducing device, an error correction circuit for error-correcting the information signals reproduced by the reproducing device, a second control circuit for controlling an operation of the error correction circuit, and a system control circuit responsive to a main command signal for supplying a first command signal and a second command signal to the first control circuit and the second control circuit, respectively, the first command signal indicating to reproduce all unit areas indicated in the main command signal and all defective areas existing among the unit areas indicated in the main command signal except for alternate recording areas of the defective areas and to reproduce the alternate recording areas after reproducing all the unit areas, and the second command signal indicating not to error-correct the information signal reproduced from the defective area.

In accordance with a fifth aspect of the present invention, there is provided a disc driving apparatus for reproducing information signals recorded in a series of unit recording areas of a disc type recording medium, a first defective area of the unit recording area being substituted by a following unit recording area and a second defective area of the unit recording area being substituted by an alternate recording area which is located apart from the series of unit recording areas. This disc driving apparatus is comprised of a reproducing device for reproducing the information signals recorded in the disc type recording medium, a first control circuit for controlling an operation of the reproducing device, an error correction circuit for error-correcting the information signals reproduced by the reproducing device, a second control circuit for controlling an operation of the error correction circuit, and a system control circuit responsive to a main command signal for supplying a first command signal and a second command signal to the first control circuit and the second control circuit, respectively, the first command signal indicating to reproduce all unit areas indicated in the main command signal and all first defective areas existing among the unit areas indicated in the main command signal, and the second command signal indicating not to error-correct the information signal reproduced from the first defective area when the first defective area exists in the area indicated by the command signal, and the first command signal indicating to reproduce all unit areas indicated in the main command signal and all second defective areas existing among the unit areas indicated in the main command signal except for alternate recording areas of the second defective areas and to reproduce the alternate recording areas after reproducing all the unit areas, and the second command signal indicating not to error-correct the information signal reproduced from the second defective area.

In accordance with a sixth aspect of the present invention, there is provided a disc driving apparatus for recording information signals to a series of unit recording areas of a disc type recording medium, a first defective area of the unit recording area being substituted by a following unit recording area and a second defective area of the unit recording area being substituted by an alternate recording area which is located apart from the series of unit recording areas. This disc driving apparatus is comprised of a recording device for recording the information signals to the disc type recording medium, a first control circuit for controlling an operation of the reproducing device, a memory for temporarily storing the information signals which are to be recorded, a second control circuit for controlling an operation of the memory, and a system control circuit responsive to a main command signal for supplying a first command signal and a second command signal to the first control circuit and the second control circuit, respectively, the first command signal indicating to record all unit areas indicated in the main command signal and all first defective areas existing among the unit areas indicated in the main command signal, and the second command signal indicating not to read out the information signal corresponding to the first defective areas when the first defective area exists in the area indicated by the main command signal, and the first command signal indicating to record all unit areas indicated in the main command signal and all second defective areas existing among the unit areas indicated in the main command signal and to record the information signal corresponding to the second defective area to the alternate recording areas after recording all the unit areas.

In accordance with a seventh aspect of the present invention, there is provided a disc driving apparatus for recording information signals to and reproducing from a series of unit recording areas of a disc type recording medium, a first defective area of the unit recording area being substituted by a following unit recording area and a second defective area of the unit recording area being substituted by an alternate recording area which is located apart from said series of unit recording areas. This disc driving apparatus is comprised of a recording and reproducing device for recording the information signals to and reproducing the information signals from the disc type recording medium, a first control circuit for controlling an operation of the recording and reproducing device, a memory for temporarily storing the information signals reproduced from the recording and reproducing device and the information signals which are to be recorded by the recording and reproducing device, a second control circuit for controlling an operation of the memory, and a system control circuit responsive to a main command signal for supplying a first command signal and a second command signal to the first control circuit and the second control circuit, respectively, the first command signal indicating to record or reproduce all unit areas indicated in the main command signal and all first defective areas existing among the unit areas indicated in the main command signal, and the second command signal indicating not to read out or not to store the information signal corresponding to the first or second defective areas when the first or second defective areas exist in the area indicated by the main command signal.

DETAILED DESCRIPTION OF THE PREFERRED EMBODIMENT

An optical disc apparatus according to an embodiment of the present invention will now be described in detail with reference to FIG. 6.

Figure 6:
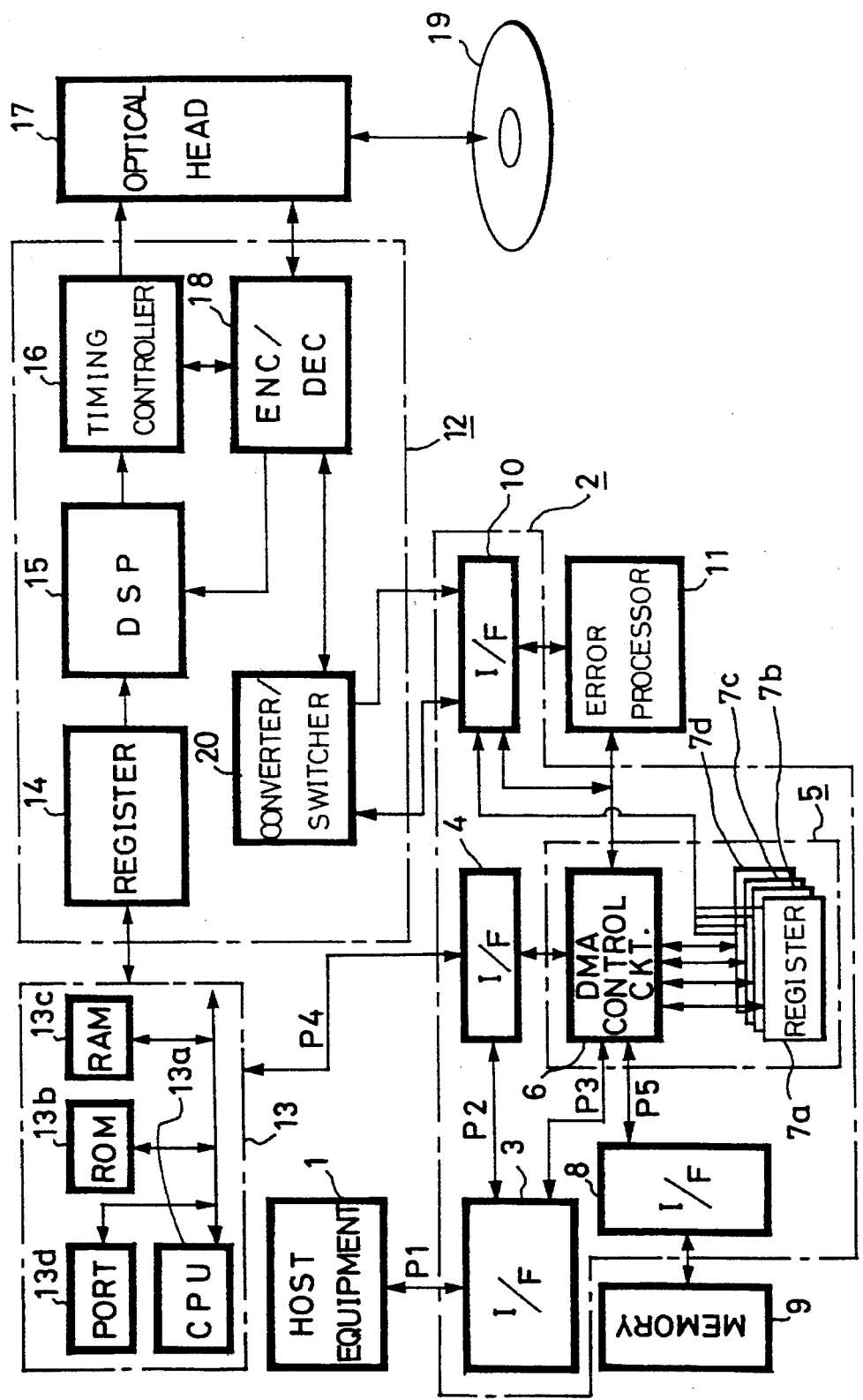
FIG. 6 is a block diagram showing an arrangement of a disc driving apparatus according to an embodiment of the present invention.

As shown in FIG. 6, there is provided a host equipment 1, such as a computer (personal computer or work station). Command signal and data from the host equipment 1 are transmitted and received by an optical data controller shown by a dashed block 2. A drive controller shown by a dashed block 12 writes data in an optical disc (magneto-optical disk, etc.) 19 or reads data from the optical disk 19. A system controller shown by a dashed block 13 controls the optical data controller 2 and the drive controller 12 on the basis of a command signal supplied thereto from the host equipment 1.

The optical data controller 2, the drive controller 12 and the system controller 13 constitute an optical disc drive, for example. The system controller 13 comprises a CPU (central processing unit) 13a, a ROM (read-only memory) 13b in which program data and parameter data are stored, a RAM (random access memory) 13c for work area and in which table data read out from the tables Tab1, Tab2, Tab3 or Tab4 shown in FIG. 4 are stored and a port 13d.

Figures 1, 2:
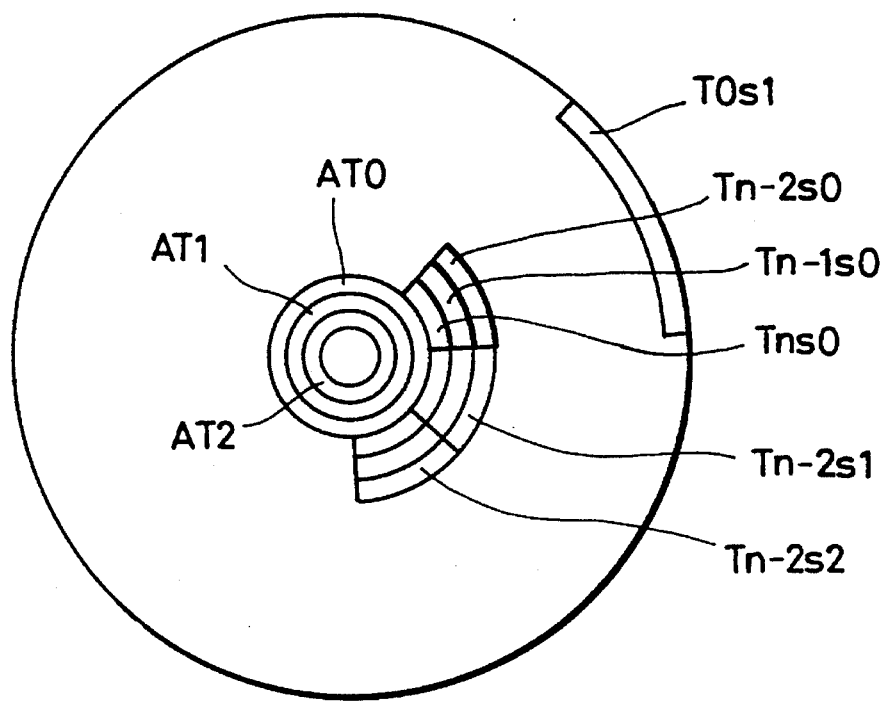
FIG. 1 is a schematic diagram showing a track pattern of a conventional optical disc.
FIG. 2 is a diagram showing a format of the conventional optical disc, and to which reference will be made in explaining an arrangement of a sector.
Figure 3:
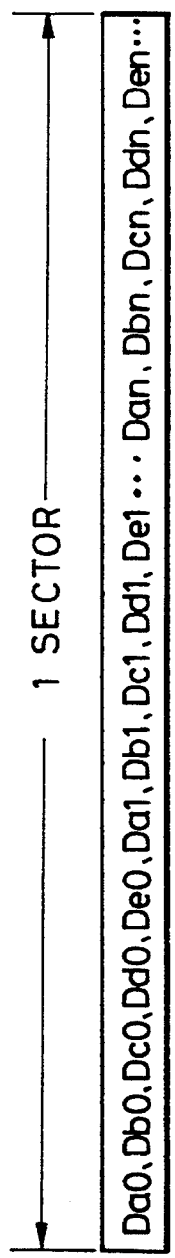
FIG. 3 is a diagram showing an example of a sector format according to the prior art.
Figure 4:
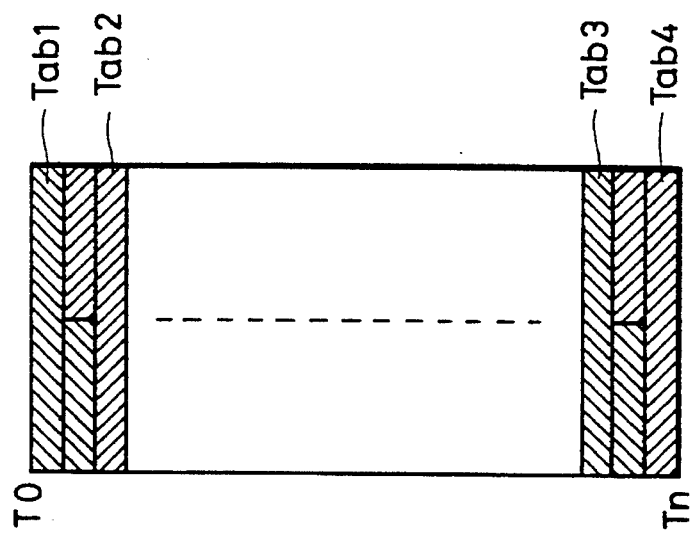
FIG. 4 is a conceptual diagram used to explain a recording position of table data on the conventional optical disc.
Figure 5:
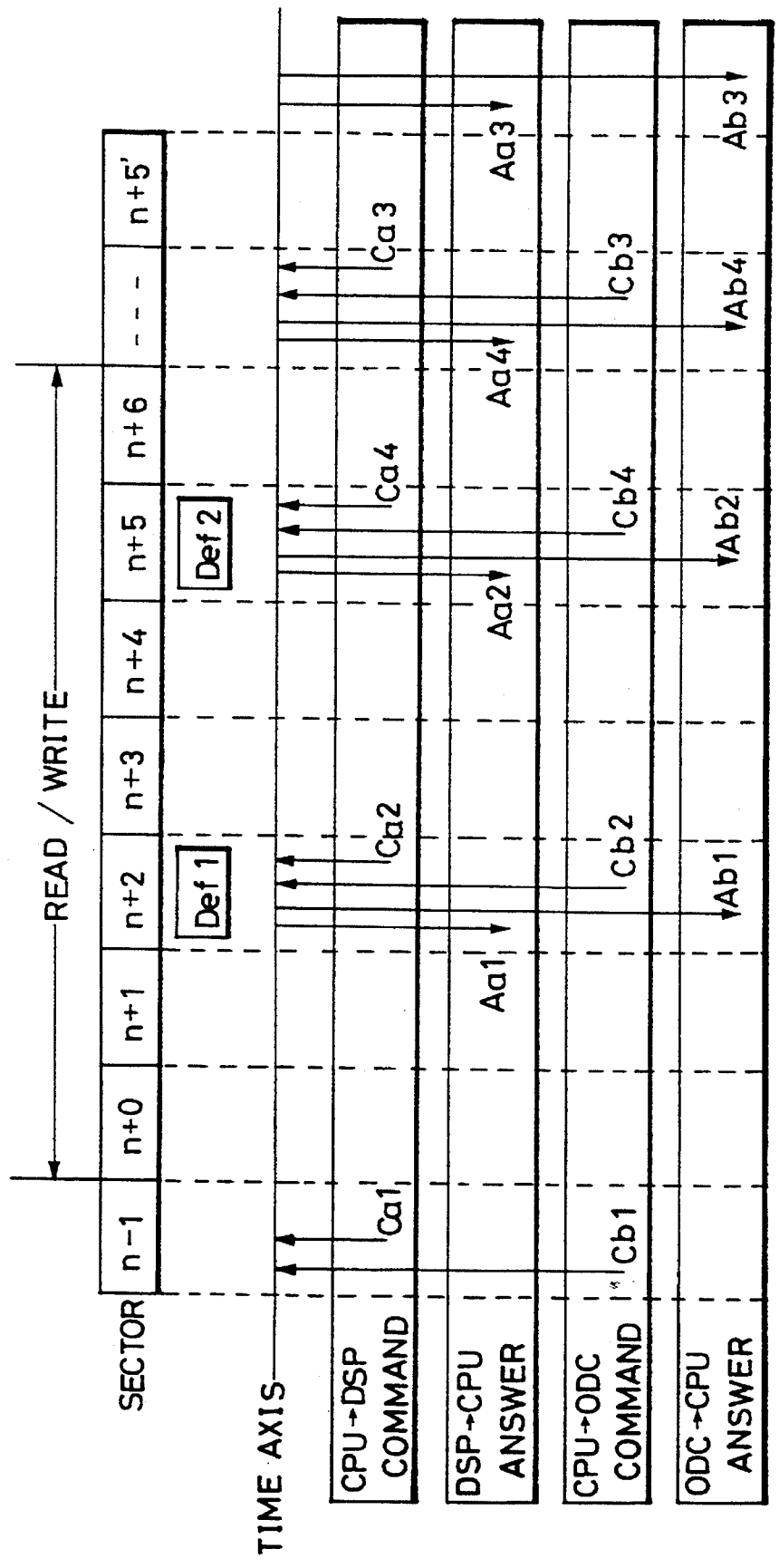
FIG. 5 is a diagram used to explain writing and reading operations in a conventional optical disc apparatus.

The system controller 13 stores in the RAM 13c table information formed of information, such as track Nos. and sector Nos. of defective sectors processed by the SSA, defective sectors processed by the LRA and replacement sectors read out from the tables Tab1, Tab2, Tab3 or Tab4 shown in FIG. 4 after the optical disc 19 was loaded onto a disc mechanism (not shown) of the optical disc drive. If a defective sector is produced when the optical disc 19 is recorded and reproduced, the CPU 13a of the system controller 13 writes a track No. and a sector No. of the defective sector and a track No. and a sector No. of an alternate track in the RAM 13c or in the tables Tab1, Tab2 Tab3 and Tab4 of the optical disc 19.

The optical data controller 2 allows a DMA (direct memory access) control circuit 6 to implement a central processing and also allows a DSP (digital signal processor) 15 to implement a central processing.

Initially, the optical data controller 2 will be described. An interface (I/F) circuit 3 is an interface, such as a SCSI (small computer systems interface) or the like. A command signal supplied from the host equipment 1 through the interface circuit 3 is supplied through an interface (I/F) circuit 4 to the CPU 13a. That is, the interface circuit 4 serves as an interface circuit to the CPU 13a of the system controller 13.

When supplied with a command signal, e.g., write and read command signals for the optical disc 19 through the interface circuit 4 from the host equipment 1, the system controller 13 supplies data representing a write or read starting track No., a sector No., and a sector length to a register 14 of the drive controller 12 on the basis of the write and read command signals supplied thereto. Also, the system controller 13 supplies address data, data length data and attribute data of a memory 9 to a register 7a or 7b and address data and data length data of the memory 9 to a register 7c or 7d.

A bus P1 shown in FIG. 6 connects the host equipment 1 and the interface circuit 3 and is used to issue a command signal from the host equipment 1 to the interface circuit 3 and to transfer data between the interface circuit 3 and the host equipment 1. A bus P2 connects the interface circuits 3 and 4 and is used to supply a command signal supplied through the interface circuit 3 from the host equipment 1 to the interface circuit 4. A bus P3 connects the interface circuit 3 and the DMA control circuit 6 and is used to transfer data between the host equipment 1 and the memory 9. A bus P4 connects the system controller 13 and the interface 4 and is used to transfer a command signal from the host equipment 1 to the system controller 13 and to transfer the address data, the data length data and the attribute data to the DMA control circuit 6.

The attribute data is formed of defective decision data representing whether the defective sector is processed using LRA or SSA. The DMA controller 5 determines which of various operations to perform on the basis of the attribute data supplied thereto.

The registers 7a, 7b and the registers 7c, 7d will be described below. The registers 7a, 7b are for use with the optical disc drive and the registers 7c, 7d are for use with the host equipment 1 (i.e., SCSI interface). According to this embodiment, the registers 7a, 7b are provided for the optical disc drive and the registers 7c, 7d are provided for the host equipment 1. In other words, the optical disc drive and the host equipment 1 include the registers 7a, 7b and the registers 7c, 7d in the form of a double-register configuration.

The reason that the registers 7a, 7b of the optical disc drive are implemented as a double-register configuration is to eliminate standby time to realize a higher processing rate by issuing a command signal from the CPU 13a of the system controller 13 to the optical data controller 2, i.e., issuing the next command signal to the register 7b or 7a before the answer signal is returned from the DMA controller 5 of the optical data controller 2 after the address data, the data length data and the attribute data were set in the register 7a or 7b.

Similarly, the reason that the registers 7c, 7d of the host equipment 1 are implemented as a double-register configuration is to remove loss caused when data is received and transmitted between the host equipment 1 and the optical disc drive to thereby improve the data transfer rate by issuing the command signal from the CPU 13a of the system controller 13 to the optical data controller 2, i.e., issuing the next command signal to the register 7d or 7c before the answer signal is returned from the DMA controller 5 of the optical data controller 2 after the address data and the data length data were set in the register 7c or 7d.

When data is written in the optical disc 19, the DMA control circuit 6 supplies and stores data supplied thereto from the host equipment 1 through the interface circuit 3 to and in the memory 9 through the interface circuit 8 on the basis of the address data and the data length data stored in the register 7c or 7d.

The DMA control circuit 6 recognizes a read-out position and a read-out data amount of the data stored in the memory 9 on the basis of the address data and the data length data memorized in the register 7a or 7b and generates an address signal supplied to the memory 9 on the basis of the read-out position and the read-out data amount. Further, the DMA control circuit 6 generates a read-out control signal (e.g., output control signal) supplied to the memory 9 on the basis of the attribute data stored in the data register 7a or 7b. Furthermore, the DMA control circuit 6 increments an address counter (not shown) which generates an address signal supplied to the memory 9.

The DMA control circuit 6 prevents incrementation of the address signal supplied to the memory 9 by making the read-out control signal supplied to the memory 9 shown in FIG. 6 inactive when the attribute data stored in the register 7a or 7b represents that a defective sector is to be processed using SSA. The address signal is prevented from incrementing by holding the increment of the address counter.

The DMA control circuit 6 increments the address signal supplied to the memory 9 by making the read-out control signal supplied to the memory 9 shown in FIG. 6 active when the attribute data stored in the register 7a or 7b is data which represents a defective sector is to be processed using LRA.

When, on the other hand, data recorded in the optical disc 19 is read out, the DMA control circuit 6 recognizes the position and the amount of data which is to be reproduced from the optical disk 19 and written in the memory 9 on the basis of the address data and the data length data stored in the register 7a or 7b and generates an address signal supplied to the memory 9 on the basis of the write position and the write data amount. Further, the DMA control circuit 6 generates a write control signal (e.g., write enable signal) supplied to the memory 9 on the basis of the attribute data stored in the data register 7a or 7b. Furthermore, the DMA control circuit 6 controls the increment of an address counter (not shown) which generates an address signal supplied to the memory 9.

The DMA control circuit 6 prevents incrementation of the address signal supplied to the memory 9 by making the write control signal supplied to the memory 9 shown in FIG. 6 inactive when the attribute data stored in the register 7a or 7b is data which represents that a defective sector is to be processed by the SSA method. The address signal is inhibited from incrementing by holding the increment of the address counter.

The DMA control circuit 6 increments the address signal supplied to the memory 9 by making the write control signal supplied to the memory 9 shown in FIG. 6 active when the attribute data stored in the register 7a or 7b is data which represents a defective sector is to be processed by the LRA method.

The DMA control circuit 6 reads out data stored in the memory 9 on the basis of the address data and the data length data stored in the register 7c or 7d and supplies the data thus read out to the host equipment 1 through the interface circuit 3.

The attribute data stored in the register 7a or 7b is supplied to the interface (I/F) circuit 10. The interface circuit 10 is also supplied with data and a request (REQUEST) pulse from the drive controller 12 which will be described later on. The interface circuit 10 serves also as a switcher to supply data read-out by the drive controller 12 to an error processor 11 or to supply the same data to the DMA controller 5 (corresponding to whether or not an error detection is performed) and to supply the request pulse to the DMA control circuit 6 on the basis of ECC control data of the attribute data from the register 7a or 7b when data is read out from the optical disc 19.

When data is written in the optical disc 19, the interface circuit 10 supplies data (specified data having no ECC added thereto) from the DMA controller 5 or data (data having ECC added thereto) from the error processor 11 to a converter/switcher 20 on the basis of the attribute data from the register 7a or 7b.

The request pulse is a pulse that is supplied from the drive controller 12 which will be described later on. The DMA control circuit 6 counts the request pulses and recognizes 1 sector when the count value becomes "600", for example. One request pulse corresponds to 1 byte of data, and the DMA control circuit 6 reads out data from the memory 9 in synchronism with the request pulse when data is written in the optical disc 19. The DMA control circuit 6 stores data in the memory 9 in synchronism with the request pulse when data is read out from the optical disc 19.

The address signal supplied from the DMA control circuit 6 to the memory 9 will be described below. The DMA control circuit 6 obtains the address signal of a sector by counting the request pulses supplied thereto from the drive controller 12. When counting the address signal of one sector, the DMA control circuit 6 obtains an address signal of the memory 9 at the area corresponding to the next sector by incrementing a high-order bit (the bit used to designate an address of the memory 9 corresponding to the starting portion of the sector). Therefore, as described above, it is possible to control the address of the memory 9 by controlling the increment of the address signal supplied to the memory 9.

The error processor 11 performs error-detection and error-correction on the data supplied from the interface circuit 10 when data is read out from the optical disc 19. Also, the error processor 11 adds data supplied to it from the DMA control circuit 6 with an error correction code, such as an ECC (error correcting code) and a CRC (cyclic redundancy check code) when data is written in the optical disc 19.

The drive controller 12 will be described. The drive controller 12 includes a register 14. The register 14 stores therein data based on the command signal from the host equipment 1, such as the track No., the sector No., and the data length (or number of sectors, etc.) data. Data stored in the register 14 is supplied to a digital signal processor (DSP) 15.

While there is provided the single register 14 as shown in FIG. 6, the present invention is not limited thereto and the register 14 may be modified as a double-register configuration, such as the registers 7a, 7b and 7c, 7d.

The digital signal processor 15 controls a timing controller 16 on the basis of the data stored in the register 14 and reproduced data (e.g., RF signal) supplied thereto from an optical head 17 through an encoder/decoder (ENC/DEC) 18. The timing controller 16 controls a processing timing or the like of the encoder/decoder 18 and the optical head 17 on the basis of a control signal from the digital signal processor 15. The encoder/decoder 18 encodes data supplied thereto from the converter/switcher 20 which will be described later on when data is written in the optical disc 19, and decodes reproduced data from the optical head 17 when data is read out from the optical disc 19. The optical head 17 includes an amplifier and a switcher in addition to an optical pickup, though not shown, and is translated on the optical disc 19 along the radial direction of the optical disc 19 by a translating mechanism (not shown).

An input and output terminal of the encoder/decoder 18 is connected to an input and output terminal of the converter/switcher 20. An input and output terminal of the converter/switcher 20 is connected to an input and output terminal of the optical data controller 2. Further, an output terminal of the converter/switcher 20 is connected to an input terminal of the interface circuit 10.

The converter/switcher 20 converts data supplied thereto through the interface circuit 10 from the optical data controller 2 into serial data when data is written in the optical disc 19, and converts data supplied thereto from the encoder/decoder 18 into parallel data when data is read out from the optical disc 19. Further, the converter/switcher 20 changes-over the writing operation and the reading operation.

Operation of the optical disc drive shown in FIG. 6 will be described.

How the optical disc drive is operated when data is written in the optical disc 19 will be described below. When a command signal representing the writing is supplied to the system controller 13 from the host equipment 1 through the interface circuits 3 and 4, the system controller 13 issues a command signal to the DMA controller 5 through the interface circuit 4. Specifically, the address data and the data length data of the memory 9 are supplied to the register 7c or 7d and the address data, the data length data and the attribute data are supplied to the register 7a or 7b.

The DMA control circuit 6 stores data supplied thereto from the host equipment 1 in the memory 9 on the basis of the address data and the data length data stored in the register 7c or 7d. The DMA control circuit 6 reads out data from the memory 9 on the basis of the attribute data stored in the register 7a or 7b, and reads out data stored in the memory 9 on the basis of the address data and the data length data stored in the register 7a or 7b in synchronism with the request pulse supplied thereto from the drive controller 12. Then, the DMA control circuit 6 supplies the data thus read out to the error processor 11 and the interface circuit 10.

The system controller 13 stores the track No., the sector No., and the data length (number of sectors) data in the register 14. The digital signal processor (DSP) 15 controls the timing controller 16 on the basis of the data stored in the register 14.

The data supplied to the error processor 11 is processed in a proper processing fashion, such as addition of error detection code or the like by the error processor 11 and is then supplied to the interface circuit 10. The interface circuit 10 selects the data supplied thereto from the DMA controller 5 or the error processor 11 on the basis of the attribute data and selected data is sequentially supplied to the converter/switcher 20. The data sequentially supplied to the converter/switcher 20 is converted into serial data by the converter/switcher 20 and encoded by the encoder/decoder 18. The data thus encoded is sequentially written in the optical disc 19 by the optical head 17.

How the optical disc drive is operated when data is read out from the optical disc 19 will be described below. When a read command signal is supplied from the host equipment 1 through the interface circuits 3 and 4 to the system controller 13, the system controller 13 supplies the track No., the sector No., and the data length (number of sectors) data of a track from which data starts being read out to the register 14.

The digital signal processor 15 controls the timing controller 16 on the basis of the content of the register 14, and data is read out from the optical disc 19 by the optical head 17. Data read out from the optical disc 19 by the optical head 17 is decoded by the encoder/decoder 18 and supplied to and converted into parallel data by the converter/switcher 20, the parallel data is then supplied to the interface circuit 10 of the optical data controller 12.

The interface circuit 10 supplies the data from the converter/switcher 20 to the error processor 11 or the DMA controller 5 on the basis of the attribute data supplied thereto from the DMA controller 5.

The system controller issues a command signal through the interface circuit 4 to the DMA controller 5. Specifically, the address data and the data length data are supplied to the register 7c or 7d and the address data, the data length data and the attribute data to the register 7a or 7b.

The DMA control circuit 6 stores data in the memory 9 on the basis of the attribute data stored in the register 7a or 7b, and stores the data supplied thereto from the error processor 11 or the interface circuit 10 in the memory 9 on the basis of the address data and the data length data stored in the register 7a or 7b in synchronism with the request pulse supplied thereto from the drive controller 12. Further, the DMA control circuit 6 reads out the data stored in the memory 9 on the basis of the address data or the data length data stored in the register 7c or 7d and supplies the data thus read out through the interface circuit 3 to the host equipment 1.

In the case of any of the writing and the reading, the command signal and the answer signal are received and transmitted between the system controller 13 and the optical data controller 2 and between the system controller 13 and the drive controller 12. Specifically, when the optical data controller 2 receives the command signal from the system controller 13, the optical data controller 2 implements the processing indicated by that command signal, and informs the system controller 13 of the answer signal representing that the processing is ended. Similarly, when the drive controller 12 receives the command signal from the system controller 13, the drive controller 12 implements the processing indicated by that command signal and informs the system controller 13 of the answer signal representing that the processing is ended.

Figure 7:
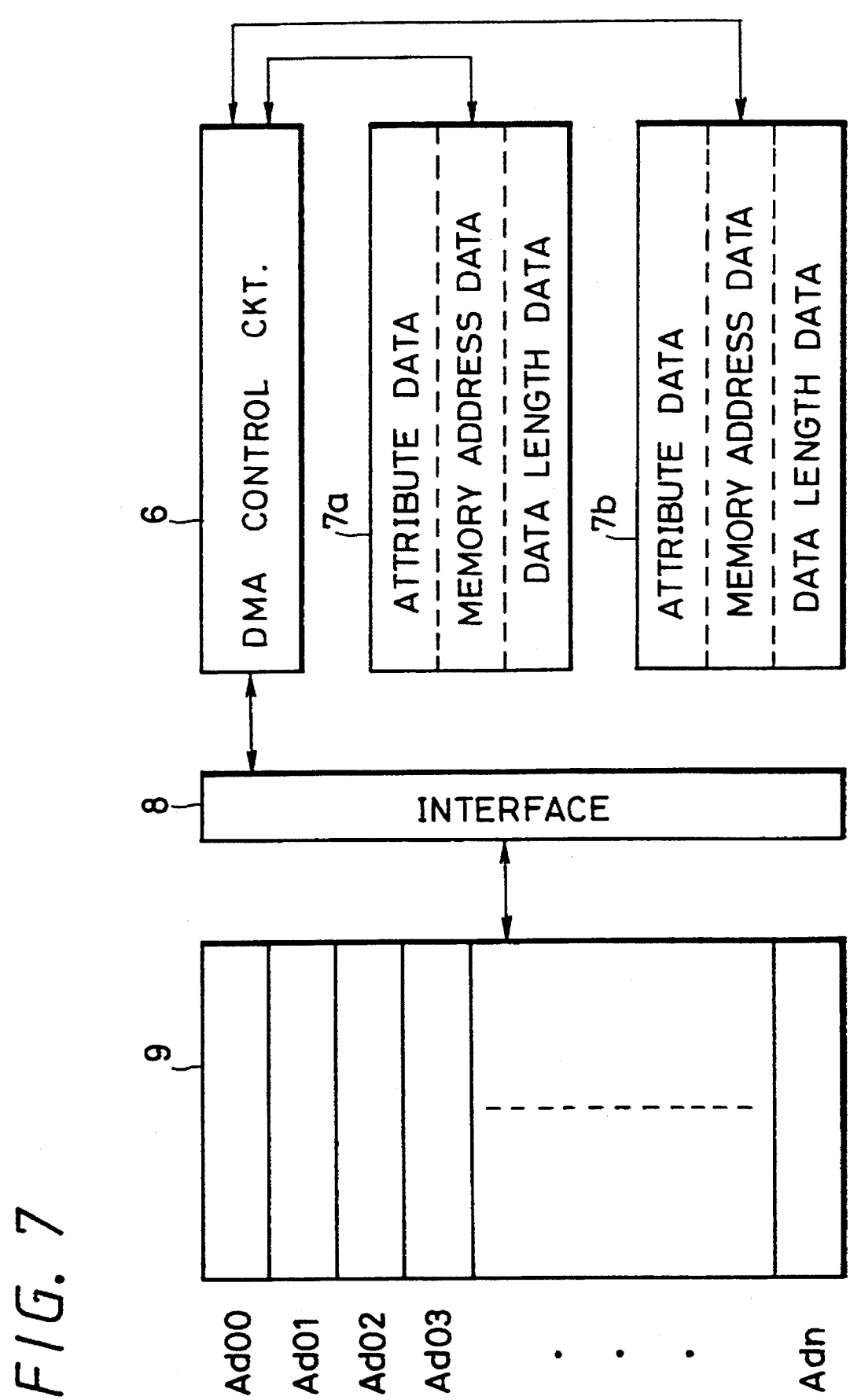
FIG. 7 is a diagram used to explain the disc driving apparatus according to the embodiment of the present invention.

The data transfer operation executed between the memory 9 and the drive controller 12 when data is written in the memory 9 and the data written in the memory 9 is read out under the control of the DMA control circuit 6 will be described with reference to FIG. 7. In FIG. 7, like parts corresponding to those of FIG. 6 are marked with the same references and therefore need not be described in detail.

In FIG. 7, Ad00, Ad01, Ad02, . . . , Adn depict addresses of the memory 9 shown in FIG. 6. Each of the memory areas corresponding to the respective addresses segmented by solid lines in FIG. 7 includes the storage capacity to store the data of one sector, for example. The areas of the memory 9 correspond to the sectors of the optical disc 19 in a one-to-one relation.

However, if the sector corresponding to any arbitrary area of the memory 9 is a defective sector processed by the SSA, when reproduced data from the optical disc 19 is stored in the memory 9, the data reproduced from the defective sector is not written in that area of the memory 9 because the data stored in that area is the reproduced data of the replacement sector for the defective sector and the write control signal supplied to the memory 9 is made inactive by the DMA control circuit 6.

If the sector corresponding to the arbitrary area of the memory 9 is a defective sector processed by the SSA, when data is read out from the memory 9 in order to record data in the optical disc 19, the DMA control circuit 6 makes the read-out control signal supplied to the memory 9 inactive so that data read out from that area is recorded in the replacement sector of the defective sector.

A defective sector processed by the LRA does not cause any problem at all because data is recorded in the replacement sector for the defective sector after the access period is completed even if data is recorded in the defective sector during the access period when data is written in the optical disc 19. Further, when the data recorded in the optical disc 19 is read out, even if data from the defective sector is stored in the corresponding area of the memory 9 during the access period, data reproduced from the replacement sector of the defective sector is recorded in the corresponding area of the memory 9 after the access period is ended. Therefore, there is then no problem. Alternatively, with respect to the defective sector processed by the LRA also, the read-out control signal supplied to the memory 9 may be made inactive and the write control signal may be made inactive similarly to the case of the defective sector processed by the SSA.

By checking the attribute data stored in the register 7a (or 7b), the DMA control circuit 6 holds the address signal supplied to the memory 9 when the defective sector is to be processed by the SSA, and increments the address signal supplied to the memory 9 when the defective sector is to be processed by the LRA as described above.

When data is written in the optical disc 19, the DMA control circuit 6 generates the address signal on the basis of the address data and the data length data stored in the register 7a (or 7b). At that time, the DMA control circuit 6 determines, by checking the attribute data stored in the register 7a (or 7b), whether the defective sector existing in the sector in which data read out from the memory 9 is to be read is processed by the SSA or by LRA.

If it is determined by the DMA control circuit 6 that the defective sector is to be processed by the SSA, then the DMA control circuit 6 inhibits the address signal supplied to the memory 9 from being incremented and also makes the read-out control signal supplied to the memory 90 inactive. If on the other hand it is determined by the DMA control circuit 6 that the defective sector is to be processed by the LRA, then the DMA control circuit 6 increments the address signal supplied to the memory 9 and also makes the read-out control signal supplied to the memory 9 active.

The above operation will be described with reference to FIG. 7. In FIG. 7, let it be assumed that the defective sector is processed by the SSA and that the address corresponding to the defective sector that the memory 9 has is Ad02 when the data is written in the optical disc 19. In this case, if the DMA control circuit 6 incremented the address signal supplied to the memory 9, then data stored in the memory 9 at the area corresponding to the address Ad02 would not be recorded in the next sector of after the defective sector, i.e. the replacement sector, but data stored in the memory 9 at the area corresponding to the address Ad03 would be recorded in the replacement sector of the defective sector because the replacement sector is the next sector after the defective sector when the defective sector is processed by the SSA.

Further, let it be assumed that the defective sector is processed by the LRA and that the address corresponding to the defective sector that the memory 9 has is Ad02 when the data is written in the optical disc 19. In this case, if the DMA control circuit 6 did not increment the address signal supplied to the memory 9, data stored in the memory 9 at the area corresponding to the address Ad03 would not be recorded in the next sector after the defective sector but data stored in the memory 9 at the area corresponding to the address Ad02 would be recorded in the next sector after the defective sector because the replacement sector is set in the sector provided within an alternate track which is a different track when the defective sector is processed by the LRA.

Therefore, if the DMA control circuit 6 controls the increment of the address signal supplied to the memory 9 on the basis of the attribute data stored in the register 7a (or 7b), when the defective sector is processed by the SSA, the address indicated by the address signal supplied to the memory 9 does not agree with an address of data that should be recorded on the next sector of the defective sector, thereby preventing the data that should be recorded on the next sector of the defective sector from being read out from the memory 9. Accordingly, the address is prevented from being shifted. When the defective sector is processed by the LRA, the address indicated by the address signal supplied to the memory 9 becomes the address of the data that should be recorded in the next sector after the defective sector. Therefore, data is recorded again in the replacement sector of the alternate track after the access is temporarily completed and the access can be made efficiently.

When data is read out from the optical disc 19, the DMA control circuit 6 generates the address signal on the basis of the address data and the data length data of the memory 9 stored in the register 7a (or 7b). At that time, the DMA control circuit 6 determines on the basis of the attribute data stored in the register 7a (or 7b) whether the defective sector existing within the access range of the optical disc 19 is to be processed by the SSA or LRA.

If it is determined by the DMA control circuit 6 that the defective sector is processed by the SSA, then the DMA control circuit 6 does not increment the address signal supplied to the memory 9 and also makes the write control signal supplied to the memory 9 inactive. If it is determined by the DMA control circuit 6 that the defective sector is processed by the LRA, then the DMA control circuit 6 increments the address signal supplied to the memory 9 and also makes the write control signal supplied to the memory 9 active.

The above operation will be described with reference to FIG. 7. Let it be assumed that the defective sector is processed by the SSA and that the address corresponding to the defective sector that the memory 9 has is Ad02 when the data is read out from the optical disc 19. In this case, if the DMA control circuit 6 incremented the address signal supplied to the memory 9, then the data read out from the next sector after the defective sector would not be stored in the memory 9 at the area corresponding to the address Ad02 but would be stored in the area of the address Ad03 of the memory 9 because the replacement sector is set in the next sector after the defective sector when the defective sector is processed by the SSA.

Further, let it be assumed that the defective sector is processed by the LRA and that the address corresponding to the defective sector that the memory 9 has is Ad02 when the data is read out from the optical disc 19. In this case, if the DMA control circuit 6 did not increment the address signal supplied to the memory 9, the data read out from the next sector after the defective sector of the optical disc 19 would not be memorized in the memory 9 at the area corresponding to the address Ad03 but would be stored in the memory 9 at the area corresponding to the address Ad02 because the replacement sector is set in the sector provided within the alternate track which is a different track when the defective sector is processed by the LRA.

Therefore, if the DMA control circuit 6 increments the address signal supplied to the memory 9 on the basis of the attribute data stored in the register 7a (or 7b), then when the defective sector is processed by the SSA, the address indicated by the address signal supplied to the memory 9 does not agree with the address in which the data read out from the next sector of the replacement sector of the defective sector should be stored. Thus, the data read out from the replacement sector of the defective sector can be prevented from being stored in the memory 9 at the area corresponding to the next sector after the defective sector. Therefore, the address can be prevented from being shifted.

When the defective sector is processed by the LRA, the address indicated by the address signal supplied to the memory 9 becomes the address in which the data read out from the next sector after the defective sector should be stored. Therefore, after the access is temporarily completed, the data read out from the replacement sector in the alternate track can be stored again in the area of the corresponding address of the memory 9. Thus, the access can be made efficiently.

The manner in which data is written to the optical disc 19 or read from it when the system controller 13 issues a command signal and how the optical data controller 2 and the drive controller 12 responds with an answer signal will be described with reference to FIGS. 8 and 9.

Figure 8:
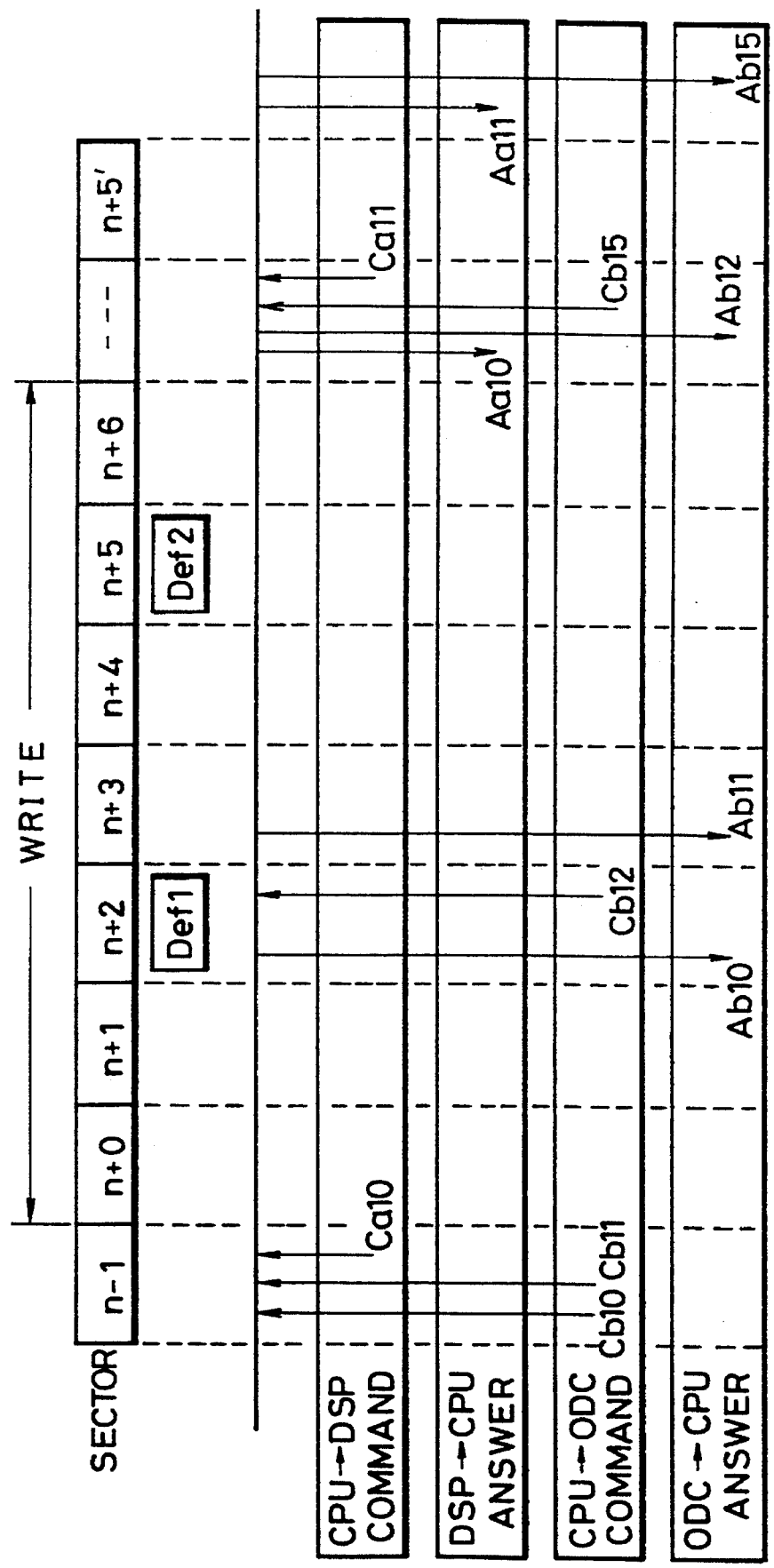
FIG. 8 is a diagram used to explain a write operation in the embodiment of the present invention.
Figure 9:
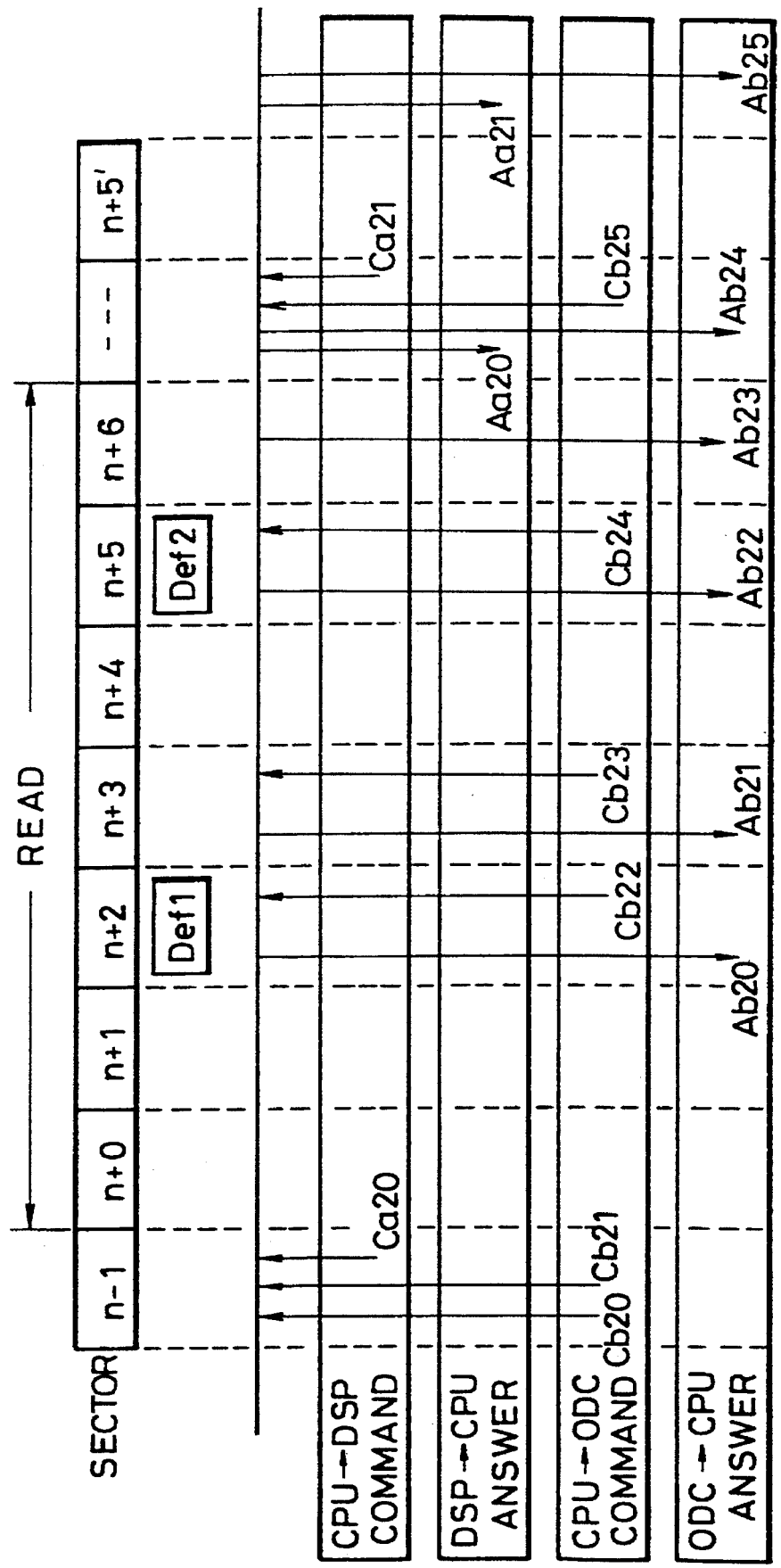
FIG. 9 is a diagram used to explain a read operation in the embodiment of the present invention.

FIGS. 8 and 9 are, respectively explanatory diagrams showing processing flows executed when data is written in and read out from the optical disc 19. In FIG. 8, n–1 to n+6 depict physical sector Nos. of respective sectors, and n+5' depicts a sector No. of a sector formed in the alternate track. In FIG. 8, solid arrows with Ca depict command signals that are issued from the CPU 13a of the system controller 13 to the digital signal processor 15 of the drive controller 12. Solid arrows with Cb depict command signals that are issued from the CPU 13a of the system controller 13 to the optical data controller 2. Solid arrows with Aa depict answer signals that are issued from the digital signal processor 15 of the drive controller 12 to the CPU 13a of the system controller 13. Solid arrows with Ab depict answer signals that are issued from the optical data controller 2 to the CPU 13a of the system controller 13.

Reference symbol Def1 shown at the position of the physical sector No. n+2 depicts a sector which was detected as defective when the disc was certified. Reference symbol Def2 shown at the position of the physical sector No. n+5 depicts a sector which was detected as defective by a disc verify when data was written in the optical disc 19 after the disc was certified. Then, the replacement sector of the defective sector Def2 becomes the sector of the physical sector No. n+5'.

If the physical sector begins with n–1 shown in FIG. 8, then when the sector of the physical sector No. n+2 is detected as defective by the disc certify, the sector Nos. of the physical sector Nos. N–1, N+0, N+1, N+3, N+4, N+5, N+6 become 0, 1, 2, 3, 4, 5, 6, in that order. In other words, the sector No. is not assigned to the physical sector No. according to the tables Tab1 and Tab2.

Although the sector having the physical sector No. n+5 which was detected as defective when it was verified is temporarily accessed, the sector of the physical sector No. N+5', which is the replacement sector, is accessed after the sector of the physical sector No. n+5 was accessed and data obtained by this access is validated.

How to write data under the control of the CPU 13a of the system controller 13, the digital signal processor 15 of the drive controller 12 and the optical data controller 2 will be described with reference to FIG. 8.

When a command signal representing the writing of data of physical sectors Nos. n+0 to n+6 is supplied from the host equipment 1 through the interface circuits 3 and 4 to the system controller 13, the CPU 13a of the system controller 13 sequentially stores data supplied to the DMA controller 5 through the interface circuit 3 to the memory 9 by rewriting the address data and the data length data present in the register 7c or 7d at the time.

Then, a command signal Cb10 representing that data of 2 sectors should be read out from the memory 9 is issued from the system controller 13 to the optical data controller 2, whereby the address data and the data length data of the memory 9 are stored in the register 7a or 7b. In this embodiment, the address data and the data length data corresponding to the command signal Cb10 are stored in the register 7a.

Then, the system controller 13 issues a command signal Cb11 including attribute data to the optical data controller 2, whereby attribute data representing that the defective sector is to be processed by the SSA is stored in the register 7b.

Subsequently, the system controller 13 issues a command signal Ca10 representing the writing to the drive controller 12. Specifically, in the register 14 are stored the track No., the sector No., the data length (number of sectors) data and instruction data which instructs that data should be written in the replacement sector for the defective sector processed by the LRA when the access is completed. In this embodiment, the physical sector number n+0 becomes the sector No., and the 7 sectors become the data length, i.e., sectors whose physical sector Nos. n+0 to n+6 become sectors that should be written.

In this embodiment, when the write command signal is supplied from the host equipment 1, the drive controller 12 processes sectors that should be written until the number of sectors reaches the number of sectors instructed by the write command signal.

The data of 2 sectors read out from the memory 9 in response to the command signal Cb10 is supplied to the DMA controller 5 through the interface circuit 8, and supplied through the interface circuit 10 to the error processor 11, in which it is added with an error correction code, such as the ECC or the like. Then, the data processed by the error processor 11 is fed through the interface circuit 10 back to the converter/switcher 20. The data is then converted by the converter/switcher 20 into serial data and supplied to the encoder/decoder 18, in which it is encoded and supplied to the optical head 17.

When the command signal Ca10 is issued to the drive controller 12, the digital signal processor 15 controls the timing controller 16, whereby data is written in the optical disc 19 by the optical head 17.

Then, at the position of the physical sector No. n+2, the answer signal Ab10 to the command signal Cb10 is supplied from the optical data controller 2 to the CPU 13a of the system controller 13. When receiving the answer signal Ab10, the CPU 13a of the system controller 13 issues a command signal Cb12 representing that data of 4 sectors should be written to the optical data controller 2, i.e., address data and data length data of the memory 9 are stored in the register 7a. Although the optical head 17 is driven by the drive controller 12 at the position of the physical sector No. n+2, data from the optical data controller 2 is not supplied and therefore meaningless data is recorded in the sector of the physical sector No. n+2. At the position of the physical sector No. N+3, data that should be written in the sectors of physical sector Nos. n+3 to n+6 is read out from the memory 9 and processed similarly as described above, whereafter it is written in the optical disc 19 by the optical head 17.

At the position of the physical sector No. n+3, an answer signal Ab11 to the command signal Cb11 is supplied from the optical data controller 2 to the CPU 13a of the system controller 13. Then, at the position of the physical sector following the physical sector n+6, an answer signal Aa10 to the command signal Ca10 is supplied from the digital signal processor 15 of the drive controller 12 to the CPU 13a of the system controller 13. Subsequently, an answer signal Ab12 to the command signal Cb12 is supplied from the optical data controller 2 to the CPU 13a of the system controller 13.

When the answer signals Aa10 and Ab12 are supplied thereto, the CPU 13a of the system controller 13 supplies the optical data controller 2 with a command signal Cb15 representing that data of one sector of the physical sector No. n+5' should be read out, i.e., address data and data length data of the memory 9 are stored in the register 7b.

Subsequently, the CPU 13a of the system controller 13 issues a command signal Ca11 representing that data of one sector from the physical sector No. n+5' should be written to the drive controller 12. When this command signal Ca11 is issued, the track No., the sector No., and the data length data of the alternate track are stored in the register 14. On the basis of these data, the digital signal processor 15 causes the optical head 17 to seek the desired track of the physical sector No. n+5'. Then, by controlling the timing controller 16, data read out from the memory 9 is written in the target sector of the physical sector No. n+5' by the optical head 17.

At the position of the physical sector following the physical sector No. n+5', the answer signal Aa11 to the command signal Ca11 is supplied from the digital signal processor 15 of the drive controller 12 to the CPU 13a of the system controller 13, and then the answer signal Ab15 to the command signal Cb15 is supplied from the optical data controller 2 to the CPU 13a of the system controller 13.

How to read data by the CPU 13a of the system controller 13, the digital signal processor 15 of the drive controller 12 and the optical data controller 2 will be described with reference to FIG. 9.

When a data read-out command signal for reading out data of the physical sector Nos. n+0 to n+6 is supplied from the host equipment 1 through the interface circuits 3 and 4 to the system controller 13, the system controller 13 issues a command signal Cb20, indicative of storing data of 2 sectors in the memory 9, to the optical data controller 2, whereby address data and data length data of the memory 9 are stored in the register 7a. In this case, address data and data length data corresponding to the command signal Cb20 are stored in the register 7a.

Then, the system controller 13 issues a command signal Cb21 including attribute data to the optical data controller 2, whereby attribute data representing that the defective sector is to be processed by the SSA is stored in the register 7b.

The system controller 13 issues a read command signal Ca20 to the drive controller 12. Specifically, the track No., the sector No., and the data length (number of sectors) data are stored in the register 14. In this embodiment, the physical sector No. becomes n+0 and 7 sectors become data length, i.e., data of the sectors of the physical Nos. n+0 to n+6 should be read out.

When the above-mentioned command signal Ca20 is issued to the drive controller 2, the digital signal processor 15 of the drive controller 2 controls the timing controller 16, whereby data of the optical disc 19 is read out by the optical head 17. Of the data thus read out, data of the physical sector Nos. n+0 and n+1 are processed in various processing manners as described above and then supplied to the interface circuit 10.

At that time, the DMA control circuit 6 checks the attribute data stored in the register 7b. The attribute data indicates that the sector n+2 is processed by the SSA. The interface circuit 10 supplies the read-out data to the error processor 11 or the DMA controller 5.

In this embodiment, the data read out from the sectors of the physical sector Nos. n+0 and n+1 are stored in the memory 9 in synchronism with the request pulse in accordance with the data stored in the register 7b. However, the attribute data indicates that the data read out from the sector of the physical sector No. n+2 is processed by the SSA. Accordingly, if this data is processed by the error correction processing, then correct data cannot be obtained. Therefore, the DMA control circuit 6 controls the error processor 11 so that the data read out from the sector of the physical sector No. n+2 is prevented from being error-corrected. Since the attribute data indicates that the defective sector Def1 is processed by the SSA, the DMA control circuit 6 makes the write control signal supplied to the memory 9 inactive with the result that the data read out from the defective sector Def1 is not stored in the memory 9.

Then, at the position of the physical sector No. n+2, an answer signal Ab20 to the command signal Cb20 is supplied from the optical data controller 2 to the CPU 13a of the system controller 13. After receiving the answer signal Ab20, the CPU 13a of the system controller 13 issues a command signal Cb22 indicative of storing data of 2 sectors to the optical data controller 2. Specifically, address data and data length data of the memory 9 are stored in the register 7a. Thereafter, data of physical sector Nos. n+3 and n+4 processed similarly as described above are stored in the memory 9.

At the position of the physical sector No. n+3, an answer signal Ab21 to the command signal Cb21 is supplied from the optical data controller 2 to the system controller 13. When receiving the answer signal Ab21, the system controller 13 issues a command signal Cb23, including data representing the processing of data of 1 sector and attribute data representing that the physical sector n+2 is a defective sector to be processed by the SSA to the optical data controller 2. Specifically, address data and data length data of the memory 9 are stored in the register 7b and the attribute data also is stored in the register 7b.

Data of a physical sector No. n+5, processed similarly to that described above is not supplied to the error processor 11 from the interface circuit 10 but is directly supplied to the DMA controller 5, i.e., incorrect data is temporarily stored in the memory 9 (data may not be stored but address may only be incremented by 1 sector).

At the position of the physical sector No. n+5, an answer signal Ab22 to the command signal Cb22 is supplied from the optical data controller 2 to the CPU 13a of the system controller 13. When the answer signal Ab22 is supplied to the system controller 13, the CPU 13a of the system controller 13 issues a command signal Cb24 representing the processing of data of 1 sector to the optical data controller 2. Specifically, address data and data length data of the memory 9 are stored in the register 7a, and then data read out from the physical sector No. n+6 similarly processed as described above is stored in the memory 9.

At the position of the physical sector No. n+6, an answer signal Ab23 to the command signal Cb23 is supplied from the optical data controller 2 to the CPU 13a of the system controller 13. Then, at the position of a physical sector No. n+7 (not shown), an answer signal Aa20 to the command signal Ca20 is supplied from the digital signal processor 15 of the drive controller 12 to the CPU 13a of the system controller 13. An answer signal Ab24 to the next command signal Cb24 is supplied from the optical data controller 2 to the CPU 13a of the system controller 13.

When supplied with the answer signals Aa20 and Ab24, the CPU 13a of the system controller 13 supplies a command signal Cb25 representing the processing of data of 1 sector to the optical data controller 2, i.e., address data and data length data are stored in the register 7b.

Then, the CPU 13a of the system controller 13 issues a command signal Ca21 representing the reading of data of 1 sector to the drive controller 12. When this command signal Ca21 is issued, the track No., the sector No., and the data length data of the alternate track are stored in the register 14. The seek operation of the optical head 17 is carried out on the basis of these data. Also, the digital signal processor 15 causes the optical head 17 to seek a target track of the physical sector No. n+5' and controls the timing controller 16, whereby data of the target physical sector n+5' is read out by the optical head 17.

This data is processed similarly as described above and then stored in the memory 9. At that time, the sector of the physical sector No. n+5' is the replacement sector of the physical sector No. n+5 so that the address data of the sector of the physical sector No. n+5' is sequentially stored at the address in which data of the sector of the physical sector No. n+5 should be stored. Specifically, the data of the sector of the physical sector No. n+5' is stored in the memory 9 in the memory area for the data of the sector of the physical sector No. n+5. Therefore, correct data, i.e., data of the sector of the physical sector No. n+5' of the alternate track, is stored in the memory 9 at the data area of the defective sector Def2.

An answer signal Aa21 to the command signal Ca21 is supplied from the digital signal processor 15 of the drive controller 12 to the CPU 13a of the system controller 13. Then, an answer signal Ab25 to a command signal Cb25 is supplied from the optical data controller 2 to the CPU 13a of the system controller 13.

The read-out address and the data length data of the memory 9 are sequentially stored in the register 7c or 7d under the control of the CPU 13a of the system controller 13. The DMA controller 5 sequentially reads out data from the memory 9 on the basis of these data and supplies the data thus read out through the interface circuits 8 and 3 to the host equipment 1.

As described above, according to this embodiment, the attribute data representing that the defective sector is processed by the SSA or LRA is added to the address data and the data length data. Also, in response to the command signal from the host equipment 1, data is written in and read out from all sectors except the defective sector detected when the optical disc is verified. After the completion of this access, when data is recorded in the optical disc 19, data is written in the replacement sector provided instead of the defective sector detected by the disc verify. When data is reproduced from the optical disc 19, data is read out from the replacement sector and the data thus read out is stored in the memory 9. Therefore, the so-called one rotation waiting, caused when a command signal and an answer signal are not completed during the access period, can be avoided, and a data transfer rate can considerably be increased by a simple arrangement according to the simple processing.

Since the address signal supplied to the memory 9 is not incremented if it is determined that the defective sector is processed by the SSA when data is recorded in the optical disc 19, data that should be recorded in the next sector of the defective sector can be prevented from being recorded in the defective sector.

Since the address signal supplied to the memory 9 is not incremented if it is determined that the defective sector is processed by the SSA when data is reproduced from the optical disc 19, data reproduced from the replacement sector and which should be stored in the memory 9 at the area corresponding to the defective sector can be prevented from being stored in the memory 9 at the area corresponding to the next sector after the replacement sector.

Since the address signal supplied to the memory 9 is incremented if it is determined that the defective sector is processed by the LRA when data is recorded in the optical disc 19, data read out from the memory 9 at the area corresponding to the defective sector and which should be recorded in the next sector after the defective sector can be prevented from being recorded in the memory 9 at the area corresponding to the defective sector.

Since the ECC error detection and error correction functions are made inactive if it is determined that the defective sector is processed by the LRA when data is reproduced from the optical disc 19, when data of the defective sector is transferred to the memory 9, the data correction by the ECC becomes impossible and therefore the DMA is forced to complete. Thus, the so-called one rotation waiting can be prevented from taking place.

While the address data, the data length data and the attribute data of the memory 9 are stored in the registers 7a and 7b as described above, the physical sector No., the number of sectors and the attribute data that should be stored in the memory 9 are stored in the registers 7a, 7b, for example, with similar effects being achieved. In this case, the DMA control circuit 6 determines the present sector by counting the request pulses. Further, the DMA control circuit 6 writes data in the memory 9 and reads out data from the memory 9 on the basis of the request pulse.

While data is not read out from the memory 9 during a period in which the recorded data is in a defective sector, when data is recorded in the optical disc 19 and data reproduced from the defective sector is not stored in the memory 9 when data is reproduced from the optical disc 19 as described above, depending on the control method of the address signal supplied to the memory 9, data may be read out from the memory 9 and the data reproduced from the defective sector may be written in the memory 9 during the period in which data is recorded in the defective sector.

How to record data in the optical disc 19 when the defective sector is processed by the SSA will be described.

When data is read out from the memory 9 during the period in which data is recorded in the defective sector, the read-out data must be written in the replacement sector for the defective sector. Therefore, when or after the DMA control circuit 6 supplies the address signal to the memory 9, data that should be recorded in the replacement sector is read out and the read-out data is recorded in the defective sector, the address signal supplied to the memory 9 is not incremented. With this arrangement, data is read out twice from the memory 9 at its area corresponding to the defective sector with the result that the same data is recorded both in the defective sector and the replacement sector.

The operation executed when data is reproduced from the optical disc 19 will be described. During a period in which data is reproduced from the defective sector, data read out from the replacement sector of the defective sector must be stored in the memory 9 at the area corresponding to the defective sector. Therefore, when or after the DMA control circuit 6 supplies the address signal to the memory 9 and data reproduced from the defective sector is stored in the area in which data reproduced from the replacement sector should be stored, the address signal supplied to the memory 9 is not incremented. With this arrangement, although data reproduced from the defective sector is stored in the memory 9 at the area corresponding to the defective sector initially, such written data is rewritten by data reproduced from the replacement sector.

The operation executed when the defective sector is processed by the LRA will be described.

In this case, since data read out from the memory 9 at the area corresponding to the defective sector is also recorded in the replacement sector of the alternate track at the completion of the access even if data is read out from the memory 9 in order to record data in the defective sector when data is recorded in the optical disc 19, data can be read out from the memory 9 satisfactorily when data is recorded in the defective sector.

Further, since data is reproduced from the replacement sector of the alternate track and the reproduced data is stored in the memory 9 at the area corresponding to the defective sector one more time at the completion of the access even if data reproduced from the defective sector is stored in the memory 9 at the area corresponding to the defective sector when data is reproduced from the optical disc 19, the data reproduced from the defective sector can be stored in the memory 9 at the area corresponding to the defective sector satisfactorily.

According to the present invention, since the system control means instructs the first control means by the first command signal such that defective sectors and sectors indicated by the main command signal are all reproduced and also instructs the second control means by the second command signal so that the information signal reproduced from the defective sector is not stored in the memory means when the defective sector (defective sector in which the replacement sector is physically set at the next position) exists within the sector which is instructed to be reproduced by the main command signal, all sectors thus instructed can continuously be reproduced and the information signal reproduced from the replacement sector can be stored instead of the information signal reproduced from the defective sector. When the defective sector in which the replacement sector is physically set at the next position exists within the sector to be reproduced, data can be reproduced at high speed by a simple arrangement and a simple processing.

According to the present invention, since the second command signal formed of the command data to at least a series of consecutive defective sectors and the command data to at least a series of consecutive sectors which are not the defective sectors instructs the second control means such that the information reproduced from the defective sector is not stored in the memory means, the control corresponding to the defective sector and the control corresponding to the sector which is not the defective sector can be carried out reliably. Therefore, the information signal reproduced from the replacement sector can be stored instead of the information signal reproduced from the defective sector, and the information signal reproduced from the sector which is not the defective sector can be stored. Thus, when the defective sector in which the replacement sector is physically set at the next position exists within the sector to be reproduced, the defective sector and the sector which is not the defective sector can be accessed properly and reliably.

According to the present invention, since the system control means alternately stores command data in a pair of command data memory means of the second control means and supplies the next command data to the other of the pair of command data memory means when the reproduction control corresponding to the command data stored in one of the pair of the command data memory means is completed, the reproduction control corresponding to the command data can continuously be carried out. Also, when the defective sector in which the replacement sector is physically set at the next position exists within the sector to be reproduced, data can be reproduced at high speed.

According to the present invention, since the system control means supplies the first control means with the first command signal such that the sectors indicated by the main command signal and defective sectors are all reproduced and also supplies the second control means with the second command signal such that the information signal reproduced from the defective sector is not error-corrected by the error correction means when the defective sector (defective sector in which the replacement sector is physically set at the next position) exists within the sector which is instructed to be reproduced by the main command signal, all sectors thus indicated can continuously be reproduced and the cumbersome processing, such as to error-correct the information signal reproduced from the defective sector which is not used as the reproduced data, can be avoided. Therefore, when the defective sector in which the replacement sector is physically set at the next position exists within the sector to be reproduced, data can be reproduced at high speed by a simple arrangement and a simple processing.

According to the present invention, since the second command signal formed of the command data to at least a series of consecutive defective sectors and the command data to at least a series of consecutive sectors which are not defective sectors instructs the second control means such that the information signal reproduced from the defective sector is not error-corrected by the error correction means, the control corresponding to the defective sector and the control corresponding to the sector which is not the defective sector can be carried out reliably. Also, the information signal reproduced from the defective sector is not error-corrected and the information signal reproduced from other sectors than the defective sector can be error-corrected. Therefore, when the defective sector in which the replacement sector is physically set at the next position exists within the sector to be reproduced, data can be reproduced at high speed by a simple arrangement and a simple processing.

According to the present invention, since the system control means alternately stores command data in a pair of command data memory means of the second control means and supplies the next command data to the other of the pair of command data memory means when the reproducing means control corresponding to the command data stored in one of the pair of command data memory means is completed, the reproduction control corresponding to the command data can continuously be carried out. Therefore, when the defective sector in which the replacement sector is physically set at the next position exists within the sector to be reproduced, data can be reproduced at high speed reliably.

According to the present invention, since the system control means supplies the first control means with the first command signal such that the sectors indicated by the main command signal and defective sectors are all recorded and also supplies the second control means with the second command signal such that the information signal is not read out from the memory means at the position corresponding to the defective sector when the defective sector exists within the sector that is instructed to be recorded by the main command signal, data can continuously be recorded in all sectors thus indicated and the disadvantage that data to be recorded in the sectors of the next sector of the defective sector is shifted by one sector when the information signal is read out from the memory means at the position corresponding to the defective sector can be avoided. Therefore, when the defective sector in which the replacement sector is physically set at the next position exists within the sector to be recorded, data can be written at high speed by a simple arrangement and a simple processing.

According to the present invention, since the second command signal formed of the command data to at least a series of consecutive defective sectors and the command data to at least a series of consecutive sectors which are not defective sectors instructs the second control means such that the information signal is not read out from the memory means at its position corresponding to the defective sector, the control corresponding to the defective sector and the control corresponding to the sector which is not the defective sector can be carried out reliably. Also, the disadvantage that data recorded in the sector of the next sector following the defective sector is shifted by one sector when the information signal is read out from the memory means at its position corresponding to the defective sector can be avoided, and the information signal that should be recorded in the sector which is not the defective sector can be correctly read out from the memory means. Therefore, when the defective sector in which the replacement sector is physically set at the next position exists within the sector to be recorded, data can be written at high speed by a simple arrangement and a simple processing.

According to the present invention, since the system control means alternately stores command data in a pair of command data memory means of the second control means and supplies the next command data to the other of the pair of command data memory means when the recording means control corresponding to the command data stored in one of the pair of command data memory means is completed, the recording control corresponding to the command data can continuously be carried out. Also, when the defective sector in which the replacement sector is physically set at the next position exists within the sector to be recorded, data can be recorded at high speed.

According to the present invention, since the system control means instructs the first control means by the first command signal such that the sectors indicated by the main command signal and defective sectors are all reproduced and then the replacement sector is reproduced and instructs the second control means by the second command signal such that the information signal reproduced from the defective sector is not error-corrected by the error correction means, the replacement sector can be reproduced after all indicated sectors are continuously reproduced. Also, the cumbersome processing, such as to error-correct the information signal reproduced from the defective sector which is not used as the reproduced data, can be avoided. Therefore, when the defective sector in which the replacement sector is set at the physically distant position exists within the indicated sector, the occurrence of the so-called one rotation waiting can be avoided and the seek operation can be suppressed to the minimum. Thus, data can be reproduced by a simple arrangement and a simple processing.

According to the present invention, since the second command signal formed of the command data to at least a series of consecutive defective sectors and the command data to at least a series of consecutive sectors which are not defective sectors instructs the second control means such that the information signal reproduced from the defective sector is not error-corrected by the error correction means, the control corresponding to the defective sector and the control corresponding to the sector which is not the defective sector can be carried out reliably. The information signal reproduced from the defective sector is not error-corrected and the information signal reproduced from other sectors than the defective sector can be error-corrected. Therefore, when the defective sector in which the replacement sector is set at the physically distant position exists within the indicated sector, the occurrence of the so-called one rotation waiting can be avoided and the seek operation can be suppressed to the minimum. Thus, data can be reproduced at high speed by a simple arrangement and a simple processing.

According to the present invention, since the second control means includes a pair of command data memory means and the system control means alternately stores the command data in the pair of command data memory means and supplies the next command data to the other of the pair of command data memory means when the reproducing means control corresponding to the command data stored in one of the pair of command data memory means is completed, the reproduction control corresponding to the command data can continuously be carried out. Therefore, when the defective sector in which the replacement sector is set at the physically distant position exists within the indicated sector, data can be reproduced at high speed by a simple arrangement and a simple processing.

According to the present invention, since the system control means instructs the first control means by the first command signal such that the sectors indicated by the main command signal and the first defective sector are all reproduced when the first defective sector (defective sector in which the replacement sector is physically set at the next position) exists within the sector which is instructed to be reproduced by the main command signal, the system control means instructs the second control means by the second command signal such that the information signal reproduced from the first defective sector is not error-corrected by the error correction means, the system control means instructs the first control means by the first command signal such that the sectors indicated by the main command signal and the second defective sector are all reproduced and then the replacement sector is reproduced and the system control means instructs the second control means by the second command signal such that the information signal reproduced from the second defective sector is not error-corrected by the error correction means when the second defective sector (defective sector in which the replacement sector is set at the physically distant position) exists within the sector which is instructed to be reproduced by the main command signal, when the first defective sector exists within the designated sector to be reproduced, all indicated sectors can continuously be reproduced and the cumbersome processing, such as to error-correct the information signal reproduced from the defective sector, can be avoided. Also, when the second defective sector exists in the indicated sector to be recorded, the replacement sector can be reproduced after all indicated sectors are continuously reproduced, and the cumbersome processing, such as to error-correct the information signal reproduced from the defective sector, can be avoided. Even when the replacement sector exists physically within the indicated sector at its next position or even when the replacement sector exists within the indicated sector at its physically distant position, the so-called one rotation waiting can be avoided and the seek operation can be suppressed to a minimum. Thus, data can be reproduced at high speed by a simple arrangement and a simple processing.

According to the present invention, since the second control means controls operation of the memory means in which the information signal reproduced by the reproducing means is temporarily stored and the system control means instructs the second control means by the second command signal such that the information signal reproduced from the first defective sector is not written in the memory means when the first defective sector exists in the sector which is instructed to be reproduced by the main command signal, the control corresponding to the first defective sector and the control corresponding to the sector which is not the defective sector can be carried out reliably. Also, the information signal reproduced from the replacement sector can be stored instead of the information signal reproduced from the first defective sector and the information signal reproduced from the sector which is not the defective sector can be stored. Therefore, even when the replacement sector exists within the indicated sector at its next physically distant position or even when the replacement sector exists within the indicated sector at its physically distant position, the so-called one rotation waiting can be avoided and the seek operation can be suppressed to a minimum. Thus, data can be reproduced at high speed by a simple arrangement and a simple processing.

According to the present invention, since the second control means is instructed by the second command signal formed of command data to at least a series of consecutive defective sectors and command data to at least a series of consecutive sectors which are not defective sectors so that the information signal reproduced from the first defective sector is not written in the memory means, the control corresponding to the first defective sector and the control corresponding to the sector which is not the defective sector can be carried out reliably. Also, the information signal reproduced from the replacement sector can be stored instead of the information signal reproduced from the first defective sector, and the information signal reproduced from the sector which is not the defective sector can be stored. Therefore, even when the replacement sector exists within the indicated sector at its next physical position or even when the replacement sector exists within the indicated sector at its physically distant position, the so-called one rotation waiting can be avoided and the seek operation can be suppressed to the minimum. Thus, data can be reproduced at high speed by a simple arrangement and a simple processing.

According to the present invention, since the second control means includes a pair of command data memory means and the system control means alternately memorizes command data in the pair of command data memory means and supplies the next command data to the other of the pair of command data memory means when the reproducing means is reproducing the information signal corresponding to the command data stored in one of the pair of command data memory means, the reproduction control corresponding to the command data can continuously be carried out. Therefore, even when the replacement sector exists within the indicated sector at its next physical position or even when the replacement sector exists within the indicated sector at its physically distant position, the so-called one rotation waiting can be avoided and the seek operation can be suppressed to the minimum. Thus, data can be reproduced at high speed by a simple arrangement and a simple processing.

According to the present invention, since the system control means instructs the first control means by the first command signal such that the sectors indicated by the first command signal and the defective sector are all recorded, the system control means instructs the second control means by the second command signal such that the information signal recorded in the defective sector is not read out from the memory means when the first defective sector exists within the sector which is instructed to be recorded by the main command signal and the system control means instructs the first control means by the first command signal such that the sectors indicated by the main command signal and the defective sector are all recorded and then the replacement sector is recorded when the second defective sector exists within the sector which is instructed to be recorded by the main command signal, if the first sector exists in all indicated sectors upon recording, data can continuously be recorded in all indicated sectors, and the disadvantage that data recorded in the sector of the next sector of the defective sector is shifted by 1 sector when the information signal is read out from the memory means at the position corresponding to the defective sector can be avoided. If the second defective sector exists in all indicated sectors, then data can be recorded in the replacement sector after data is continuously recorded in all indicated sectors. Even when the replacement sector exists within the indicated sector at its next physical position or even when the replacement sector exists within the indicated sector at its physically distant position, the so-called one rotation waiting can be avoided and the seek operation can be suppressed to the minimum. Thus, data can be recorded at high speed by a simple arrangement and a simple processing.

According to the present invention, since the second control means is instructed by the second command signal formed of command data to at least a series of consecutive defective sectors and command data to at least a series of consecutive sectors which are not defective sectors such that the information signal recorded in the defective sector is not read out from the memory means, the control corresponding to the defective sector and the control corresponding to the sector which is not the defective sector can be carried out reliably, and the disadvantage that data recorded in the sector of the next sector following the defective sector is shifted by 1 sector when the information signal is read out from the memory means at the position corresponding to the defective sector can be avoided. At the position of the sector which is not the defective sector, the information signal that should be recorded in the sector which is not the defective sector can correctly be read out from the memory means. Therefore, even when the replacement sector exists within the indicated sector at its next physical position or even when the replacement sector exists within the indicated sector at its physically distant position, the so-called one rotation waiting can be avoided and the seek operation can be suppressed to the minimum. Thus, data can be recorded at high speed by a simple arrangement and a simple processing.

According to the present invention, since the second control means includes a pair of command data memory means and the system control means alternately stores command data in the pair of command data memory means and supplies the next command data to the other of the pair of command data memory means when the recording means control corresponding to the command data stored in one of the pair of command data memory means, the recording control corresponding to the command data can continuously be carried out. Therefore, even when the replacement sector exists within the indicated sector at its next physical position or even when the replacement sector exists within the indicated sector at its physically distant position, the so-called one rotation waiting can be avoided and the seek operation can be suppressed to the minimum. Thus, the data can be recorded at high speed by a simple arrangement and a simple processing.

According to the present invention, since the system control means instructs the first control means by the first command signal such that the sectors indicated by the first command signal and the defective sector are all recorded or reproduced and the system control means instructs the second control means by the second command signal such that the recorded or reproduced signal recorded in or reproduced from the defective sector is not read out from or written in the memory means, if the first defective sector exists in all indicated sectors upon reproduction, all indicated sectors can continuously be reproduced. When the second defective sector exists within all indicated sectors, the replacement sector can be reproduced after all indicated sectors are continuously reproduced, and the information reproduced from the replacement sector can be stored instead of the information signals reproduced from the first and second defective sectors. Upon recording, if the first defective sector exists in all indicated sectors, then data can continuously be recorded in all indicated sectors. If the second sector exists in all indicated sectors, then data can be recorded in the replacement sector after data is continuously recorded in all indicated sectors, and the disadvantage that data to be recorded in the sector of the next sector following the defective sector is shifted by 1 sector when the information signal is read out from the memory means at its positions corresponding to the first and second defective sectors can be avoided. Further, even when the replacement sector exists within the indicated sector at its next physical position or even when the replacement sector exists within the indicated sector at its physically distant position, the so-called one rotation waiting can be avoided and the seek operation can be suppressed to the minimum. Thus, data can be recorded and reproduced at high speed by a simple arrangement and a simple processing.

Further, according to the present invention, since the second control means is instructed by the second command signal formed of command data to at least a series of consecutive defective sectors and command data to at least a series of consecutive sectors which are not defective sectors such that the recorded or reproduced signal recorded in and reproduced from the defective sector is not read out from or written in the memory means, the control corresponding to the defective sector and the control corresponding to the sector which is not the defective sector can be carried out reliably. Therefore, upon recording, the disadvantage that data recorded in the sector of the next sector of the defective sector is shifted by 1 sector when the information signal is read out from the memory means at its position corresponding to the defective sector can be avoided. At the position of the sector which is not the defective sector, the information signal that should be recorded in the sector which is not the defective sector can be correctly read out from the memory means. Upon reproduction, the information signal reproduced from the replacement sector can be stored instead of the information signal reproduced from the defective sector, and the information signal reproduced from the sector which is not the defective sector can be recorded. Also, even when the replacement sector exists within the indicated sector at its next physical position or even when the replacement sector exists within the indicated sector at its physically distant position, the so-called one rotation waiting can be avoided and the seek operation can be suppressed to the minimum. Thus, data can be recorded and reproduced at high speed by a simple arrangement and a simple processing.

Furthermore, according to the present invention, since the second control means includes a pair of command data memory means and the system control means alternately stores command data in the pair of command data memory means and supplies the next command data to the other of the pair of command data memory means when the recording and reproducing means control corresponding to the command data stored in one of the command data memory means is completed, the recording and reproducing control corresponding to the command data can continuously be carried out. Therefore, even when the replacement sector exists within the indicated sector at its next physical position or even when the replacement sector exists within the indicated sector at its physically distant position, the so-called one rotation waiting can be avoided and the seek operation can be suppressed to the minimum. Thus, data can be recorded and reproduced at high speed by a simple arrangement and a simple processing.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A disc driving apparatus for reproducing information signals recorded in a series of unit recording areas of a disc type recording medium, a defective area of the series of unit recording areas being substituted by a following unit recording area, said disc driving apparatus comprising:

reproducing means for reproducing the information signals recorded in said disc type recording medium;

first control means for controlling an operation of said reproducing means;

memory means for temporarily storing the information signals reproduced by said reproducing means;

second control means for controlling an operation of said memory means; and system control means responsive to a main command signal for supplying a first command signal and a second command signal to said first control means and said second control means, respectively, said first command signal indicating to reproduce all unit areas indicated in said main command signal and all defective areas existing among the unit areas indicated in said main command signal, and said second command signal indicating not to write the information signal reproduced from the defective area into said memory means.

2. The disc driving apparatus according to claim 1, wherein said second command signal comprises at least first command data for consecutive defective areas and second command data for consecutive effective recording areas.

3. The disc driving apparatus according to claim 2, wherein said second control means includes a pair of command data memories, and said system control means controls said pair of command data memories to store the command data alternately and supplies the next command data to one of the pair of command data memories when said system control means receives answer signal data, which indicates that the operation in accordance with the command data stored in said one of the pair of command data memories is finished, from said second control means.

4. A disc driving apparatus for recording information signals in a series of unit recording areas of a disc type recording medium, a defective area of the series of unit recording areas being substituted by a following unit recording area, said disc driving apparatus comprising:

recording means for recording the information signals to said disc type recording medium;

first control means for controlling an operation of said recording means;

memory means for temporarily storing the information signals which are to be recorded in said disc type recording medium;

second control means for controlling an operation of said memory means; and system control means responsive to a main command signal for supplying a first command signal and a second command signal to said first control means and said second control means, respectively, said first command signal indicating to record all unit areas indicated in said main command signal and all defective areas existing among the unit areas indicated in said main command signal, and said second command signal indicating not to read the information signal corresponding to the position of the defective area.

5. The disc driving apparatus according to claim 4, wherein said second command signal comprises at least first command data for consecutive defective areas and second command data for consecutive effective recording areas.

6. The disc driving apparatus according to claim 5, wherein said second control means includes a pair of command data memories, and said system control means controls said pair of command data memories to store the command data alternately and supplies the next command data to one of the pair of command data memories when said system control means receives answer data, which indicates that the operation in accordance with the command data stored in said one of the pair of command data memories is finished, from said second control means.

7. A disc driving apparatus for recording information signals to a series of unit recording areas of a disc type recording medium, a first defective area of the series of unit recording areas being substituted by a following unit recording area and a second defective area of the unit recording area being substituted by an alternate recording area which is located apart from said series of unit recording areas, said disc driving apparatus comprising:

recording means for recording the information signals to said disc type recording medium;

first control means for controlling an operation of said reproducing means;

memory means for temporarily storing the information signals which are to be recorded;

second control means for controlling an operation of said memory means; and system control means responsive to a main command signal for supplying a first command signal and a second command signal to said first control means and said second control means, respectively, said first command signal indicating to record all unit areas indicated in said main command signal and all first defective areas existing among the unit areas indicated in said main command signal, and said second command signal indicating not to read out the information signal corresponding to the first defective areas when the first defective area exists in the area indicated by said main command signal, and said first command signal indicating to record all unit areas indicated in said main command signal and all second defective areas existing among the unit areas indicated in said main command signal and to record the information signal corresponding to the second defective area to the alternate recording areas after recording all the unit areas.

8. The disc driving apparatus according to claim 7, wherein said second command signal comprises at least first command data for consecutive defective areas and second command data for consecutive effective recording areas.

9. The disc driving apparatus according to claim 8, wherein said second control means includes a pair of command data memories, and said system control means controls said pair of command data memories to store the command data alternately and supplies the next command data to one of the pair of command data memories when said system control means receives answer data, which indicates that the operation in accordance with the command data stored in said one of the pair of command data memories is finished, from said second control means.

10. A disc driving apparatus for recording information signals to and reproducing from a series of unit recording areas of a disc type recording medium, a first defective area of the series of unit recording areas being substituted by a following unit recording area and a second defective area of the series of unit recording areas being substituted by an alternate recording area which is located apart from said series of unit recording areas, said disc driving apparatus comprising:

recording and reproducing means for recording the information signals to and reproducing the information signals from said disc type recording medium;

first control means for controlling an operation of said recording and reproducing means;

memory means for temporarily storing the information signals reproduced from said recording and reproducing means and the information signals which are to be recorded by said recording and reproducing means;

second control means for controlling an operation of said memory means; and system control means responsive to a main command signal for supplying a first command signal and a second command signal to said first control means and said second control means, respectively, said first command signal indicating to record or reproduce all unit areas indicated in said main command signal and all first defective areas existing among the unit areas indicated in said main command signal, and said second command signal indicating not to read out or not to store the information signal corresponding to the first or second defective areas when the first or second defective areas exist in the area indicated by said main command signal.

11. The disc driving apparatus according to claim 10, wherein said second command signal comprises at least first command data for consecutive defective areas and second command data for consecutive effective recording areas.

12. The disc driving apparatus according to claim 11, wherein said second control means includes a pair of command data memories, and said system control means controls said pair of command data memories to store the command data alternately and supplies the next command data to one of the pair of command data memories when said system control means receives answer data, which indicates that the operation in accordance with the command data stored in said one of the pair of command data memories is finished, from said second control means.

* * * * *